US009258559B2

(12) United States Patent
Chen et al.

(10) Patent No.: US 9,258,559 B2
(45) Date of Patent: *Feb. 9, 2016

(54) REFERENCE PICTURE LIST CONSTRUCTION FOR MULTI-VIEW AND THREE-DIMENSIONAL VIDEO CODING

(71) Applicant: Qualcomm Incorporated, San Diego, CA (US)

(72) Inventors: Ying Chen, San Diego, CA (US); Ye-Kui Wang, San Diego, CA (US); Li Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 151 days.

This patent is subject to a terminal disclaimer.

(21) Appl. No.: 13/720,622

(22) Filed: Dec. 19, 2012

(65) Prior Publication Data

US 2013/0155184 A1 Jun. 20, 2013

Related U.S. Application Data

(60) Provisional application No. 61/578,178, filed on Dec. 20, 2011.

(51) Int. Cl.
*H04N 7/12* (2006.01)
*H04N 11/02* (2006.01)
(Continued)

(52) U.S. Cl.
CPC ..... *H04N 19/00569* (2013.01); *H04N 13/0048* (2013.01); *H04N 19/50* (2014.11); *H04N 19/597* (2014.11)

(58) Field of Classification Search
CPC ............ H04N 19/00569; H04N 19/50; H04N 19/597; H04N 19/0048
USPC .......................................................... 348/43
See application file for complete search history.

(56) References Cited

U.S. PATENT DOCUMENTS 7,970,221 B2   6/2011   Yang
8,139,150 B2   3/2012   Nakamura et al.
(Continued)

FOREIGN PATENT DOCUMENTS

JP   2008182669 A   8/2008
JP   2009100070 A   5/2009
(Continued)

OTHER PUBLICATIONS

Boyce et al., "JCT-VC break-out report: Reference picture buffering and list construction (AHG21)," Joint Collaborative Team on Video Coding, JCTVC-G1002, Nov. 21-30, 2011, 21 pp.
(Continued)

*Primary Examiner* — Hee-Yong Kim
(74) *Attorney, Agent, or Firm* — Shumaker & Sieffert, P.A.

(57) ABSTRACT

A video encoder generates, based on a reference picture set of a current view component, a reference picture list for the current view component. The reference picture set includes an inter-view reference picture set. The video encoder encodes the current view component based at least in part on one or more reference pictures in the reference picture list. In addition, the video encoder generates a bitstream that includes syntax elements indicating the reference picture set of the current view component. A video decoder parses, from the bitstream, syntax elements indicating the reference picture set of the current view component. The video decoder generates, based on the reference picture set, the reference picture list for the current view component. In addition, the video decoder decodes at least a portion of the current view component based on one or more reference pictures in the reference picture list.

28 Claims, 7 Drawing Sheets

(51) Int. Cl.
H04N 11/04 (2006.01)
H04N 13/00 (2006.01)
H04N 15/00 (2006.01)
H04N 19/50 (2014.01)
H04N 19/597 (2014.01)

(56) References Cited

U.S. PATENT DOCUMENTS

| | | |
|---|---|---|
| 2007/0030356 A1 | 2/2007 | Yea et al. |
| 2009/0147860 A1 | 6/2009 | Pandit et al. |
| 2010/0002762 A1 | 1/2010 | Pandit et al. |
| 2010/0027654 A1 | 2/2010 | Jeon et al. |
| 2010/0061452 A1 | 3/2010 | Pandit et al. |
| 2010/0091881 A1 | 4/2010 | Pandit et al. |
| 2010/0142617 A1 | 6/2010 | Koo et al. |
| 2010/0189173 A1* | 7/2010 | Chen et al. ............... 375/240.02 |
| 2010/0260265 A1 | 10/2010 | Jeon et al. |
| 2010/0266042 A1 | 10/2010 | Koo et al. |
| 2010/0316134 A1 | 12/2010 | Chen et al. |
| 2011/0064146 A1 | 3/2011 | Chen et al. |
| 2012/0069903 A1 | 3/2012 | Lim et al. |
| 2012/0106634 A1 | 5/2012 | Jeon et al. |
| 2012/0257838 A1 | 10/2012 | Kitagawa et al. |
| 2012/0269275 A1 | 10/2012 | Hannuksela |
| 2013/0034170 A1 | 2/2013 | Chen et al. |

FOREIGN PATENT DOCUMENTS

| | | |
|---|---|---|
| RU | 2008142771 A | 5/2010 |
| RU | 2009103915 A | 8/2010 |
| WO | 2007114608 A1 | 10/2007 |
| WO | 2007126508 A2 | 11/2007 |
| WO | 2007126509 A2 | 11/2007 |
| WO | 2008005574 A2 | 1/2008 |
| WO | 2008088497 A2 | 7/2008 |
| WO | 2010096189 A1 | 8/2010 |
| WO | 2011013257 A1 | 2/2011 |
| WO | 2011035211 A2 | 3/2011 |
| WO | 2011074153 A1 | 6/2011 |

OTHER PUBLICATIONS

Bross et al., "High efficiency video coding (HEVC) text specification draft 6," Joint Collaborative Team on Video Coding, JCTVC-H1003, Nov. 21-30, 2011, 259 pp.
Bross et al., "High efficiency video coding (HEVC) text specification draft 7," Joint Collaborative Team on Video Coding, JCTVC-I1003_D2, Apr. 27-May 7, 2012, 290 pp.
Bross et al., "High efficiency video coding (HEVC) text specification draft 8," Joint Collaborative Team on Video Coding, JCTVC-J1003_D7, Jul. 11-20, 2012, 261 pp.
Bross et al., "High Efficiency Video Coding (HEVC) text specification draft 9," Joint Collaborative Team on Video Coding, JCTVC-K1003_v7, Oct. 10-19, 2012, 290 pp.
Bross et al., "WD4: Working Draft 4 of High-Efficiency Video Coding," Joint Collaborative Team on Video Coding, JCTVC-F803_d2, Jul. 14-22, 2011, 226 pp.
Bross et al., "WD5: Working Draft 5 of High-Efficiency Video Coding," Joint Collaborative Team on Video Coding, JCTVC-G1103_d2, Nov. 21-30, 2011, 214 pp.
Chen, et al., "The Emerging MVC Standard for 3D Video Services," EURASIP Journal on Advances in Signal Processing, Article ID 786015, 2009, 13 pp.
Gruneberg et al., "Deliverable D3.2 MVC/SVC storage format" Information and Communication Technologies Programme, Jan. 29, 2009, Retrieved from the Internet: URL:http://www.ist-sea.eu/Public/SEA_D3.2_HHIFF_20090129.pdf [retrieved on Sep. 9, 2010], 34 pp.
International Search Report and Written Opinion—PCT/US2012/071049—ISA/EPO—Mar. 19, 2013-12 pp.
International Telecommunication Union, "Advanced video coding for generic audiovisual services," Standardization Sector of ITU, Jun. 2011, 674 pp.
International Telecommunication Union, "Generic coding of moving pictures and associated audio information", H.220.0, Amendment 4, Dec. 2009, 30 pp.
Pandit et al., "H.264/AVC extension for MVC using SEI message", Joint Video Team, JVT-X061, Jun. 29-Jul. 6, 2007, 14 pp.
Sjoberg et al., "Absolute signaling of reference pictures", Joint Collaborative Team on Video Coding, JCTVC-F493, Jul. 2011, 10 pp.
Sullivan et al., Editors' draft revision to ITU-T Rec. H.264 | ISO/IEC 14496-10 Advanced Video Coding—in preparation for ITU-T SG 16 AAP Consent (in integrated form), Joint Video Team, Document: JVT-AD007, Jan. 29-Feb. 3, 2009, 683 pp.
Tech et al., "3D-HEVC Test Model 1," Joint Collaborative Team on 3D Video Coding Extension Development, JCT3V-A1005_d0, Jul. 16-20, 2012, 83 pp.
International Standardization Organization, "Information Technology—MPEG Video Technologies—Part 3: Representation of auxiliary video and supplemental information," IS0/IEC FDIS 23002 2:2007 (E), Jan. 29, 2007, 30 pp.
U.S. Appl. No. 13/559,269, by Chen et al., filed Jul. 26, 2012.
U.S. Appl. No. 13/559,281, by Chen et al., filed Jul. 26, 2012.
Vetro et al., "Joint Draft 8.0 on Multiview Video Coding", Joint Collaborative Team on Video Coding, JVT-AB204, Jul. 20-25, 2008, 63 pp.
Wiegand et al., "WD2: Working Draft 2 of High-Efficiency Video Coding", Joint Collaborative Team on Video Coding, JCTVC-D503, Jan. 20-28, 2011, 153 pp.
Wiegand et al., "WD3: Working Draft 3 of High-Efficiency Video Coding," Joint Collaborative Team on Video Coding, JCTVC-E603, Mar. 16-23, 2011,193 pp.
Wiegand et al.,"WD1: Working Draft 1 of High-Efficiency Video Coding", Joint Collaborative Team on Video Coding, JCTVC-C403, Oct. 7-15, 2010, 137 pp.
ITU-T H.265, Series H: Audiovisual and Multimedia Systems, Infrastructure of audiovisual services—Coding of moving video, High efficiency video coding, The International Telecommunication Union, Oct. 2014, 540 pp.
Boyce, et al., "Picture parameter set RBSP syntax," 7th Meeting, Geneva, CH, Nov. 21-30, 2011, Document: JCTVC-G1002_r1 , 9 pp.
Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.
Bross et al., "High efficiency video coding (HEVC) text specification draft 10 (For FDIS & Last Call)," 12th Meeting: Geneva, CH, Jan. 14-23, 2013, JCTVC-L1003_v34, 310 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
Response to Written Opinion dated Mar. 19, 2013, from International Application No. PCT/US2012/071049, filed on Jul. 29, 2013, 44 pp.
Second Written Opinion from International Application No. PCT/US2012/071049, dated Nov. 20, 2013, 7 pp.
Response to Second Written Opinion dated Nov. 20, 2013, from International Application No. PCT/US2012/071049, filed on Jan. 16, 2014, 6 pp.
International Preliminary Report on Patentability—PCT/US2012/071049—The International Bureau of WIPO—Geneva, Switzerland, Mar. 21, 2014, 8 pp.
Boyce, et al., "JCT-VC break-out report: Reference picture buffering and list construction (AHG21) Output WD Text," 7th Meeting, Geneva, CH, Nov. 21-30, 2011, Document: JCTVC-G1002_r1, 9 pp.
Wang et al., "AHG21: On DPB management", JCT-VC Meeting; MPEG Meeting; Nov. 21-30, 2011; Geneva; (Joint Collaborative Team on Video Coding of ISO/IEC JTC1/SC29/WG11 and ITU-T SG. 16); URL: http://wftp3.itu.int/av-arch/jctvc-site/, No. JCTVC-G314, XP030110298, 7 pp.
First Office Action, and translation thereof, from counterpart Japanese Patent Application No. 2014-548909, dated Oct. 20, 2015, 13 pp.

* cited by examiner

REFERENCE PICTURE LIST CONSTRUCTION FOR MULTI-VIEW AND THREE-DIMENSIONAL VIDEO CODING

This application claims the benefit of U.S. Provisional Patent Application No. 61/578,178, filed Dec. 20, 2011, the entire content of which is incorporated herein by reference.

TECHNICAL FIELD

This disclosure relates to video coding (i.e., encoding and/or decoding of video data).

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

SUMMARY

A video encoder generates, based on a reference picture set of a current view component, a reference picture list for the current view component. The reference picture set includes an inter-view reference picture set. The inter-view reference picture list includes reference pictures that belong to the same access unit as the current view component, but are associated with different views than the current view component. The video encoder user inter-view prediction or inter prediction to encode the current view component based on one or more reference pictures in the reference picture list. In addition, the video encoder generates a bitstream that includes syntax elements indicating the reference picture set of the current view component. A video decoder parses, from the bitstream, syntax elements indicating the reference picture set of the current view component. The video decoder generates, based on the reference picture set, the reference picture list for the current view component. In addition, the video decoder decodes the current view based on one or more reference pictures in the reference picture list.

In one aspect, this disclosure describes a method for multiview video decoding. The method comprises parsing, from a bitstream, syntax elements indicating a reference picture set of a current view component of an access unit. The reference picture set includes an inter-view reference picture set that includes a plurality of view components that belong to the access unit and that are associated with different views. The method also comprises generating, based on the reference picture set, a reference picture list for the current view component. In addition, the method comprises decoding at least a portion of the current view component based on one or more reference pictures in the reference picture list.

In another aspect, this disclosure describes a method for video encoding. The method comprises generating, based on a reference picture set of a current view component of an access unit, a reference picture list for the current view component. The reference picture set includes an inter-view reference picture set that includes a plurality of view components that belong to the access unit and that are associated with different views. The method also comprises encoding the current view component based at least in part on one or more reference pictures in the reference picture list. In addition, the method comprises generating a bitstream that includes syntax elements indicating the reference picture set of the current view component.

In another aspect, this disclosure describes a video decoding device that comprises one or more processors configured to parse, from a bitstream, syntax elements indicating a reference picture set of a current view component of an access unit. The reference picture set includes an inter-view reference picture set that includes a plurality of view components that belong to the access unit and that are associated with different views. The one or more processors are also configured to generate, based on the reference picture set, a reference picture list for the current view component. In addition, the one or more processors are configured to decode at least a portion of the current view component based on one or more reference pictures in the reference picture list.

In another aspect, this disclosure describes a video encoding device that comprises one or more processors configured to generate, based on a reference picture set of a current view component of an access unit, a reference picture list for the current view component. The reference picture set includes an inter-view reference picture set that includes a plurality of view components that belong to the access unit and that are associated with different views. The one or more processors are also configured to encode the current view component based on one or more reference pictures in the reference picture list. In addition, the one or more processors are configured to generate a bitstream that includes syntax elements indicating the reference picture set of the current view component.

In another aspect, this disclosure describes a video decoding device comprising means for parsing, from a bitstream, syntax elements indicating a reference picture set of a current view component of an access unit. The reference picture set includes an inter-view reference picture set that includes a plurality of view components that belong to the access unit and that are associated with different views. The video decoding device also comprises means for generating, based on the reference picture set, a reference picture list for the current view component. In addition, the video decoding device comprises means for decoding at least a portion of the current view component based on one or more reference pictures in the reference picture list.

In another aspect, this disclosure describes a video encoding device comprising means for generating, based on a reference picture set of a current view component of an access unit, a reference picture list for the current view component. The reference picture set includes an inter-view reference picture set that includes a plurality of view components that belong to the access unit and that are associated with different views. The video encoding device also comprises means for encoding the current view component based on one or more reference pictures in the reference picture list. In addition, the video encoding device comprises means for generating a bitstream that includes syntax elements indicating the reference picture set of the current view component.

In another aspect, this disclosure describes a computer-readable storage medium that stores computer-executable instructions that, when executed by one or more processors of a video decoding device, configure the video decoding device to parse, from a bitstream, syntax elements indicating a reference picture set of a current view component of an access unit. The reference picture set includes an inter-view reference picture set that includes a plurality of view components that belong to the access unit and that are associated with different views. The instructions also configured the video decoding device to generate, based on the reference picture set, a reference picture list for the current view component. Furthermore, the instructions configure the video decoding device to decode at least a portion of the current view component based on one or more reference pictures in the reference picture list.

In another aspect, this disclosure describes a computer-readable storage medium that stores computer-executable instructions that, when executed by one or more processors of a video decoding device, configure the video encoding device to generate, based on a reference picture set of a current view component of an access unit, a reference picture list for the current view component. The reference picture set includes an inter-view reference picture set that includes a plurality of view components that belong to the access unit and that are associated with different views. The instructions also configure the video encoding device to encode the current view component based on one or more reference pictures in the reference picture list. In addition, the instructions configure the video encoding device to generate a bitstream that includes syntax elements indicating the reference picture set of the current view component.

The details of one or more examples of the disclosure are set forth in the accompanying drawings and the description below. Other features, objects, and advantages will be apparent from the description, drawings, and claims.

DETAILED DESCRIPTION

As part of an inter prediction process, a video encoder signals, in a bitstream, a reference picture set of a particular view component. The reference picture set of the particular view component may include reference pictures that are available to be used for inter prediction of blocks within the particular view component. In Multi-View Coding (MVC) and 3-dimensional video (3DV) coding, the video encoder may use view components of the same access unit as the particular view component as reference pictures for encoding the particular view component. However, the video encoder does not signal such inter-view reference pictures in the reference picture set of the view component. This may decrease the efficiency of a video decoder that decodes the bitstream.

In accordance with the techniques of this disclosure, a video encoder may generate, based on a reference picture set of a current view component of an access unit, a reference picture list for the current view component. The reference picture set includes an inter-view reference picture set that includes a plurality of view components that belong to the access unit. Each view component in the inter-view reference picture set may be are associated with a different view. Furthermore, the video encoder may encode at least portions of the current view component based at least in part on one or more reference pictures in the reference picture list. In addition, the video encoder may generate a bitstream that includes syntax elements indicating the reference picture set of the current view component.

Likewise, in accordance with the techniques of this disclosure, a video decoder may parse, from a bitstream, syntax elements indicating a reference picture set of a current view component of an access unit. The reference picture set includes an inter-view reference picture set that includes a plurality of view components. The view components of the inter-view reference picture set belong to the access unit. Each view component of the inter-view reference picture set is associated with a different view. The video decoder may generate, based on the reference picture set, a reference picture list for the current view component. Furthermore, the video decoder may decode at least portions of the current view component based on one or more reference pictures in the reference picture list.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

Figure 1:
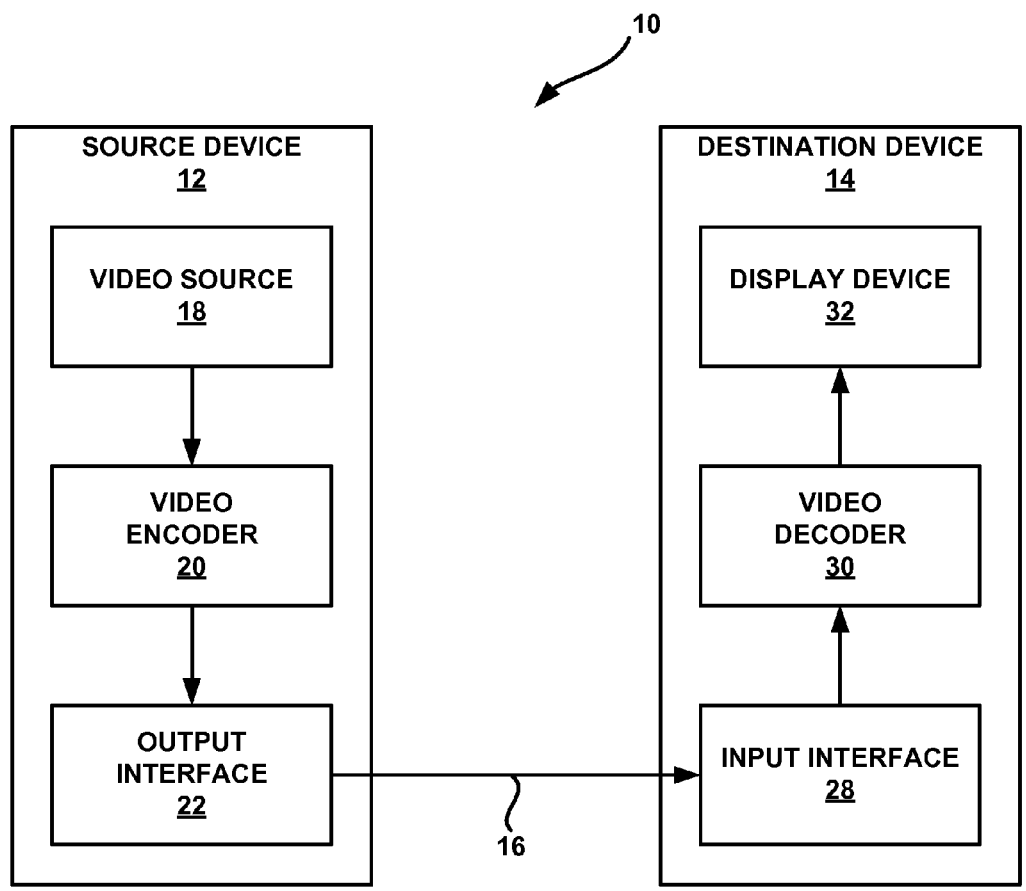
FIG. 1 is a block diagram illustrating an example video coding system that may utilize the techniques described in this disclosure.

FIG. 1 is a block diagram illustrating an example video coding system 10 that may utilize the techniques of this disclosure. As used described herein, the term "video coder" refers generically to both video encoders and video decoders. In this disclosure, the terms "video coding" or "coding" refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 decodes the encoded video data generated by source device 12. Accordingly, destination device 14 may be referred to as a video decoding device or a video decoding apparatus. Source device 12 and destination device 14 are examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) and Multiview Video Coding (MVC) extensions. A draft of the MVC extension of H.264 is, as of Dec. 19, 2012, available for download at http://wftp3.itu.int/av-arch/jvt-site/2009_01_Geneva/JVT-AD007.zip, the entire content of which is incorporated herein by reference.

In other examples, video encoder 20 and video decoder 30 may operate according to other video compression standards, including the High Efficiency Video Coding (HEVC) standard presently under development. A draft of the upcoming HEVC standard, referred to as "HEVC Working Draft 4," is described in Bross et al., "WD4: Working Draft 4 of High Efficiency Video Coding," Joint Collaborative Team on Video Coding (JCT-VC) of ITU-T SG16 WP3 and ISO/IEC JTC1/SC29/WG11, 6th Meeting: Torino, Italy, July, 2011, which, as of Dec. 19, 2012, is downloadable from: http://phenix.int-evry.fr/jct/doc_end_user/documents/6_Torino/wg11/JCTVC-F803-v8.zip, the entire content of which is incorporated herein by reference. Another draft of the upcoming HEVC standard, referred to as "HEVC Working Draft 9," is described in Bross et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting: Shanghai, China, October, 2012, which, as of Dec. 19, 2012, is downloadable from: http://phenix.int-evry.fr/jct/doc_end_user/documents/11_Shanghai/wg11/JCTVC-K1003-v8.zip, the entire content of which is incorporated herein by reference. Furthermore, video encoder 20 and video decoder 30 may operate according to a multi-view extension of HEVC. A draft of the multi-view extension of HEVC is described in Tech et al., "MV-HEVC Working Draft 2," Joint Collaborative Team on 3D Video Coding Extension Development of ITU-T SG16 WP3 and ISO/IEC JTC1/SC29/WG11, $2^{nd}$ Meeting: Shanghai, China, October 2012, which as of Dec. 19, 2012 is downloadable from: http://phenix.int-evry.fr/jct2/doc_end_user/documents/2_Shanghai/wg11/JCT3V-B1004-v1.zip, the entire content of which is incorporated herein by reference. Furthermore, video encoder 20 and video decoder 30 may operate according to a 3DV extension of HEVC. A draft of the 3DV extension of HEVC is described in Hannuksela et al., "3D-HEVC Test Model 1," Joint Collaborative Team on 3D Video Coding Extension Development of ITU-T SG16 WP3 and ISO/IEC JTC 1/SC 29/WG11, $1^{st}$ Meeting: Stockholm, Sweden, July 2012, which as of Dec. 19, 2012 is downloadable from: http://phenix.it-sudparis.eu/jct3v/doc_end_user/documents/1_Stockholm/wg11/JCT3V-A1005-v1.zip, the entire content of which is incorporated herein by reference. The techniques of this disclosure, however, are not limited to any particular coding standard or technique.

FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. An encoding device may encode and store data to memory, and/or a decoding device may retrieve and decode data from memory. In many examples, the encoding and decoding is performed by devices that do not communicate with one another, but simply encode data to memory and/or retrieve and decode data from memory.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

As mentioned briefly above, video encoder 20 encodes video data. The video data may comprise one or more pictures. Each of the pictures may be a still image. In some instances, a picture may be referred to as a video "frame." Video encoder 20 may generate a bitstream that includes a sequence of bits that form a coded representation of the video data. The coded representation of the video data may include coded pictures and associated data. A coded picture is a coded representation of a picture. The associated data may include sequence parameter sets (SPSs), picture parameter sets (PPSs), and other syntax structures. A SPS may contain parameters applicable to zero or more sequences of pictures. A PPS may contain parameters applicable to zero or more pictures. A syntax structure may be a set of zero or more syntax elements present together in a bitstream in a specified order.

Video encoder 20 typically operates on video blocks within individual video frames in order to encode the video data. In H.264/AVC, a video block may correspond to a macroblock or a partition of a macroblock in H.264/AVC. In HEVC, a video block may correspond to a coding unit (CU). Video blocks may have fixed or varying sizes, and may differ in size according to a specified coding standard. Furthermore, each video frame may include a plurality of slices. Each slice may include a plurality of video blocks.

When video encoder 20 encodes a video block, video encoder 20 may generate a predictive pixel block that corresponds to the video block. Video encoder 20 may perform intra prediction or inter prediction to generate the predictive pixel block. When video encoder 20 performs intra prediction on a video block, video encoder 20 may generate, based on samples (e.g., values of pixel components) within the same video frame as the video block, a predictive pixel block that corresponds to the video block. When video encoder 20 performs inter prediction to generate a predictive pixel block that corresponds to a video block, video encoder 20 may generate the predictive pixel block based on samples within one or more reference pictures. The reference pictures may be pictures other than the picture that contains the video block.

After video encoder 20 generates a predictive pixel block that corresponds to a video block, video encoder 20 may generate a residual video block that corresponds to the video block. Each sample in the residual video block may be based on a difference between corresponding samples in the video block and the predictive pixel block. Video encoder 20 may apply a transform to the residual video block to generate one or more coefficient blocks. Video encoder 20 may apply various transforms to the residual video block. For example, video encoder 20 may apply a transform such as a discrete cosine transform (DCT), an integer transform, a wavelet transform, or a conceptually-similar transform to the residual video block. Video encoder 20 may quantize the coefficient block to further reduce the number of bits used to represent the video block. After quantizing the coefficient block, video encoder 20 may perform and entropy encode (e.g., context-adaptive binary arithmetic coding (CABAC), context-adaptive variable length coding (CAVLC), exponential-Golomb coding, etc.) syntax elements that represent coefficients in the coefficient block and on other syntax elements associated with the video block. Video encoder 20 may output a bitstream that includes the entropy-encoded syntax elements associated with the video block.

Video decoder 30 may receive a bitstream that includes an encoded representation of video data. Video decoder 30 may parse the bitstream to extract syntax elements from the bitstream. As part of extracting the syntax elements from the bitstream, video decoder 30 may apply entropy decoding to portions of the bitstream. For each respective video block of each frame of the video data, video decoder 30 may perform, based at least in part on the syntax elements associated with the respective video block, inter or intra prediction to generate a predictive pixel block for the respective video block. In addition, video decoder 30 may inverse quantize coefficients of coefficient blocks associated with the respective video block and may apply one or more inverse transforms to the coefficient blocks to generate a residual video block for the respective video block. Video decoder 30 may then reconstruct the respective video block based at least in part on the residual video block and the predictive pixel block. In this way, by reconstructing each of the video blocks of a frame, video decoder 30 may reconstruct the frame.

As mentioned above, video encoder 20 may perform inter prediction to generate a predictive pixel block that corresponds to a particular video block. More specifically, video encoder 20 may perform uni-directional inter prediction or bi-directional inter prediction to generate the predictive pixel block.

When video encoder 20 performs uni-directional inter prediction for a particular video block, video encoder 20 may search for a reference block within reference pictures in a single reference picture list. The reference block may be a block of samples that is similar to the particular video block. Furthermore, when video encoder 20 performs uni-directional inter prediction, video encoder 20 may generate motion information for the particular video block. The motion information for the particular video block may include a motion vector and a reference picture index. The motion vector may indicate a spatial displacement between a position of the particular video block within the current frame (i.e., the frame that includes the particular video block) and a position of the reference block within the reference frame. The reference picture index indicates a position within the reference picture list of the reference frame that contains the reference picture list. The predictive pixel block for the particular video block may be equal to the reference block.

When video encoder 20 performs bi-directional inter prediction for a particular video block, video encoder 20 may search for a first reference block within reference pictures in a first reference picture list ("list 0") and may search for a second reference block within reference pictures in a second reference picture list ("list 1"). Video encoder 20 may generate, based at least in part on the first and the second reference blocks, the predictive pixel block for the particular video block. In addition, video encoder 20 may generate a first motion vector that indicates a spatial displacement between the particular video block and the first reference block. Video encoder 20 may also generate a first reference picture index that identifies a location within the first reference picture list of the reference picture that contains the first reference block. Furthermore, video encoder 20 may generate a second motion vector that indicates a spatial displacement between the particular video block and the second reference block. Video encoder 20 may also generate a second reference picture index that identifies a location within the second reference picture list of the reference picture that includes the second reference block.

When video encoder 20 performs uni-directional inter prediction on a particular video block, video decoder 30 may use the motion information of the particular video block to identify the reference sample of the particular video block. Video decoder 30 may then generate the predictive pixel block of the particular video block based on the reference sample of the particular video block. When video encoder 20 performs bi-directional inter prediction on a particular video block, video decoder 30 may use the motion information of the particular video block to identify the two reference samples of the particular video block. Video decoder 30 may generate the predictive pixel block of the particular video block based on the two reference samples of the particular video block.

H.264/AVC may be extended to provide for Multiview Video Coding (MVC). In the MVC extension to H.264, there may be multiple views of the same scene from different viewpoints. The term "access unit" is used to refer to the set of pictures that correspond to the same time instance. Thus, video data may be conceptualized as a series of access units occurring over time.

Figure 2:
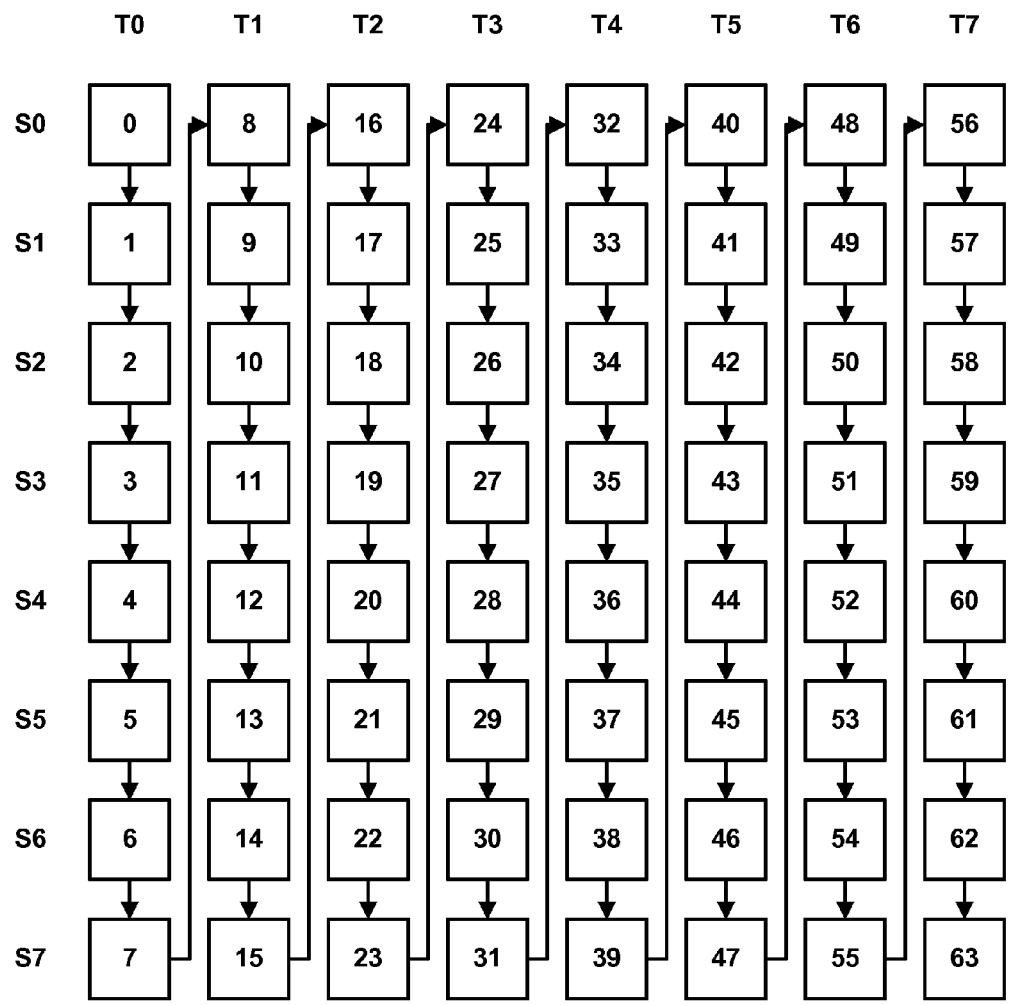
FIG. 2 is a conceptual diagram that illustrates an example Multiview Video Coding (MVC) decoding order.

FIG. 2 is a conceptual diagram that illustrates an example MVC decoding order. In the example of FIG. 2, each square corresponds to a picture. Columns of squares correspond to access units. Each access unit may be defined to contain the coded pictures of all the views of a time instance. Rows of squares correspond to views. In the example of FIG. 2, the access units are labeled T0 . . . T7 and the views are labeled S0 . . . S7. Because each picture of an access unit is decoded before any view component of the next access unit, the decoding order of FIG. 7 may be referred to as time-first coding. As shown in the example of FIG. 2, the decoding order of pictures may not be identical to the output or display order of the pictures.

The MVC extension of H.264/AVC, the MVC extension of HEVC and other standards provide for inter-view prediction. Inter-view prediction is similar to the inter prediction used in H.264/AVC and may use the same syntax elements. However, when video encoder 20 performs inter-view prediction on a video block, video encoder 20 may use, as a reference picture, a picture that is in the same access unit as the video block, but in a different view. In contrast, conventional inter prediction only uses pictures in different access units as reference pictures. In MVC, a view is referred to as a "base view" if a video decoder (e.g., video decoder 30) can decode pictures in the view without reference to pictures in any other view. Performing motion compensation on a picture in a different view of a same access unit may be referred to as disparity motion compensation. This disclosure may refer to a view component used as a reference picture for inter-view prediction as an inter-view reference view component. In some examples, an inter-view reference picture may be a view component with nal_ref_flag equal to 1 or may be a view component with nal_ref_flag equal to 0.

Figure 3:
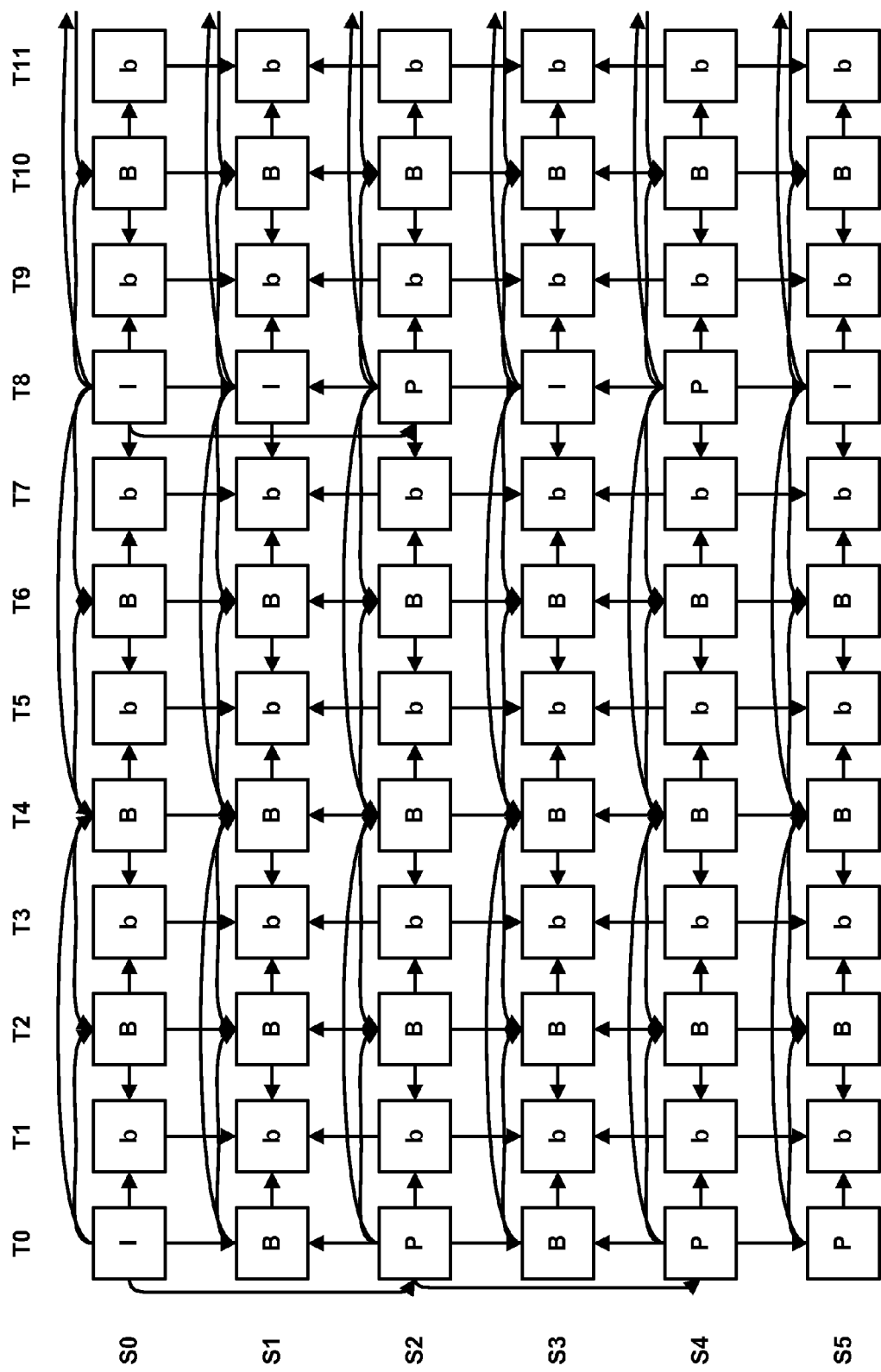
FIG. 3 is a conceptual diagram that illustrates an example MVC temporal and inter-view prediction structure.

FIG. 3 is a conceptual diagram that illustrates an example MVC temporal and inter-view prediction structure. In the example of FIG. 3, each square corresponds to a picture. Squares labeled "I" are intra predicted pictures. Squares labeled "P" are uni-directionally inter predicted pictures. Squares labeled "B" and "b" are bi-directionally inter predicted pictures. Squares labeled "b" are bi-directionally predicted pictures that are not used as reference pictures for other pictures. Squares labeled "B" are bi-directionally predicted pictures that may be used as reference pictures for other pictures. An arrow that points from a first square to a second square indicates that the first square is available in inter prediction as a reference picture for the second square. As indicated by the vertical arrows in FIG. 3, pictures in different views of the same access unit may be available as reference pictures. The use of one picture of an access unit as a reference picture for another picture of the same access unit may be referred to as inter-view prediction.

In the MVC extension of H.264/AVC, inter-view prediction may implemented as if the picture in another view is an inter prediction reference picture. When coding a current picture in a non-base view, a picture may be added into a reference picture list, if the picture is in a different view but with a same time instance (i.e., access unit) as the current picture. An inter-view prediction reference picture can be put in any position of a reference picture list, like any other type of inter prediction reference picture. In the MVC extension of H.264/AVC, video encoder 20 may signal, in an extension of a SPS for a video sequence, the inter-view reference pictures that may potentially be used for pictures in the video sequence. Table 1, below, is an example syntax for the extension of the SPS.

nents with view order identifiers equal to i. A view identifier may be a value that identifies a particular camera position. All view components that belong to the same camera position may be associated with the same view identifier. A view order index is a signed integer that specifies the ordering of coded views from left to right. In contrast, a view identifier (viewId) does not imply any ordering of camera positions.

Furthermore, the SPS MVC extension may include, for each view, "anchor_ref_l0" syntax elements that indicate view identifiers of pictures that video decoder 30 may include in an initial version of reference picture list 0 for inter-view prediction of anchor pictures. An anchor picture is a coded picture in which all slices reference only slices in the same access unit. That is, video encoder 20 may use inter-view prediction to encode an anchor picture, but video encoder 20 does not use inter prediction to encode the anchor picture. The SPS MVC extension may also include, for each view, "anchor_ref_l1" syntax elements that indicate view identifiers of pictures that video decoder 30 may include in an initial version of reference picture list 1 for inter-view prediction of anchor pictures. Furthermore, the SPS MVC extension may

TABLE 1

| | Descriptor |
|---|---|
| seq_parameter_set_mvc_extension( ) { | |
|   num_views_minus1 | ue(v) |
|   for( i = 0; i <= num_views_minus1; i++ ) | |
|     view_id[ i ] | ue(v) |
|   for( i = 1; i <= num_views_minus1; i++ ) { | |
|     num_anchor_refs_l0[ i ] | ue(v) |
|     for( j = 0; j < num_anchor_refs_l0[ i ]; j++ ) | |
|       anchor_ref_l0[ i ][ j ] | ue(v) |
|     num_anchor_refs_l1[ i ] | ue(v) |
|     for( j = 0; j <num_anchor_refs_l1[ i ]; j++ ) | |
|       anchor_ref_l1[ i ][ j ] | ue(v) |
|   } | |
|   for( i = 1; i <= num_views_minus1; i++ ) { | |
|     num_non_anchor_refs_l0[ i ] | ue(v) |
|     for( j = 0; j < num_non_anchor_refs_l0[ i ]; j++ ) | |
|       non_anchor_ref_l0[ i ][ j ] | ue(v) |
|     num_non_anchor_refs_l1[ i ] | ue(v) |
|     for( j = 0; j < num_non_anchor_refs_l1[ i ]; j++ ) | |
|       non_anchor_ref_l1[ i ][ j ] | ue(v) |
|   } | |
|   num_level_values_signalled_minus1 | ue(v) |
|   for( i = 0; i <= num_level_values_signalled_minus1; i++ ) { | |
|     level_idc[ i ] | u(8) |
|     num_applicable_ops_minus1[ i ] | ue(v) |
|     for( j = 0; j <= num_applicable_ops_minus1[ i ]; j++ ) { | |
|       applicable_op_temporal_id[ i ][ j ] | u(3) |
|       applicable_op_num_target_views_minus1 [ i ][ j ] | ue(v) |
|       for( k = 0; k <= applicable_op_num_target_views_minus1[ i ][ j ]; k++ ) | |
|         applicable_op_target_view_id[ i ][ j ][ k ] | ue(v) |
|       applicable_op_num_views_minus1[ i ][ j ] | ue(v) |
|     } | |
|   } | |
| } | |

In Table 1 and in the following tables, the syntax elements with type descriptor ue(v) are variable-length unsigned integers encoded using $0^{th}$ order Exponential-Golomb coding with left bit first. In Table 1 and in the following tables, a syntax element having a type descriptor of the form u(n), where n is a non-negative integer, are unsigned values of length n. For instance, the syntax elements with type descriptors u(3) and u(8) are an unsigned integer with 3 and 8 bits, respectively.

In the SPS MVC extension of Table 1, the "num_views_minus1" syntax element, plus 1, indicates the maximum number of coded views in a coded video sequence. The "view_id [i]" syntax elements indicate view identifiers of view compoinclude, for each view, "non_anchor_refs_l0" syntax elements that indicate view identifiers of pictures that video decoder 30 may include in list 0 for inter-view prediction of non-anchor view components. Similarly, the SPS MVC extension may include, for each view, "non_anchor_refs_l1" syntax elements that indicate view identifiers of pictures that video decoder 30 may include in list 1 for inter-view prediction of non-anchor view components. In this way, the SPS MVC extension of Table 1 may provide different prediction relationships for anchor pictures and non-anchor pictures of the same view.

In the MVC extension of H.264/AVC, a NAL unit may include a one-byte NAL unit header and a three-byte MVC NAL unit header extension if the NAL unit type is a prefix NAL unit or a MVC video coding layer (VCL) NAL unit. A prefix NAL unit in MVC may contain only a NAL unit header and the MVC NAL unit header extension. A MVC VCL NAL unit may be a coded slice NAL unit. In H.264/AVC, the term "VCL NAL unit" is a collective term for referring to coded slice NAL units and coded slice data partition NAL units. Table 2, below, indicates an example syntax for the MVC NAL unit header extension ("nal_unit_header_mvc_extension").

TABLE 2

|  | C | Descriptor |
|---|---|---|
| nal_unit_header_mvc_extension( ) { |  |  |
| non_idr_flag | All | u(1) |
| priority_id | All | u(6) |
| view_id | All | u(10) |
| temporal_id | All | u(3) |
| anchor_pic_flag | All | u(1) |
| inter_view_flag | All | u(1) |
| reserved_one_bit | All | u(1) |
| } |  |  |

In the example syntax of Table 2, the non_idr_flag indicates whether the NAL unit belongs to an instantaneous decoding refresh (IDR) NAL unit. A random access point is a picture that includes only I slices. A random access point is a picture that includes only I slices. The priority_id syntax element may be used for one-path adaption, wherein adaptation can be done by checking priority_id. The view_id syntax element may indicate a view identifier of a current view. The NAL unit may include a coded representation of a slice of a view component of the current view. The temporal_id syntax element may indicate a temporal level of the NAL unit. The temporal level of a NAL unit may indicate a picture rate associated with the NAL unit. The anchor_pic_flag syntax element may indicate whether the NAL unit belongs to an anchor picture that can be used for random access. The inter_view_flag syntax element indicates whether a current view component is used for inter-view prediction for NAL units in other views. The NAL unit may include a coded representation of a slice of the current picture.

In addition to encoding multiple views, there is an ongoing effort to generate a three-dimensional video (3DV) coding extensions to H.264 and HEVC. The 3DV extensions provide for depth maps. Depth maps are pictures whose pixel values represent the three-dimensional depths of objects shown in corresponding "texture" pictures. In some examples, brighter pixel values in a depth map may correspond to objects that are closer to a camera and darker pixel values in a depth map may correspond to objects that are further from the camera. The "texture" pictures may include conventional pictures. In contrast to 3DV, MVC does not provide for depth maps and only texture pictures are coded. However, because the 3DV extensions also use multiple texture views, the 3DV extensions may employ many of coding techniques used in MVC.

In the 3DV extensions to H.264/AVC and HEVC, video encoder 20 may encode a depth map in the same manner as other views of an access unit. That is, in addition to texture pictures for different views, an access unit may include a depth map. A depth map for an access unit may also be referred to as a "depth view component" of the access unit. The term "view component" may be used to refer to either texture view components or the depth view component of an access unit.

Video coders (e.g., video encoder 20 and video decoder 30) may use Depth Image Based Rendering (DIBR) to generate, based on available texture and depth view components, synthetic texture view components. A synthetic texture view component may be a texture view component that is synthesized based on a depth map and one or more texture view components. In some instances, a synthetic texture view component may be used as a reference picture for inter-access unit prediction or inter-view prediction. Synthetic texture view components that are used as reference pictures may be referred to as view synthesis reference pictures (VSRPs). Video coders may include VSRPs in reference picture lists. In some specific designs, a video coder may use multiple view components (with depth) to generate one VSRP through DIBR. In some examples, only one VSRP may be available for each coded picture.

Some reference pictures are "short-term" reference pictures and some reference pictures are "long-term" reference pictures. Long-term reference pictures may remain in the reference picture lists for longer periods of time than short-term reference pictures. If video encoder 20 determines that it would be advantageous to maintain the availability of a reference picture for an extended period of time (e.g., several seconds), video encoder 20 may signal that the reference picture is a long-term reference picture. For instance, video encoder 20 may indicate that a reference frame is a long-term reference picture if the reference picture contains a static background and other pictures cover and uncover portions of this static background. In H.264/AVC or H.264/MVC, a short-term reference picture never has a frame number (frame_num) equal to the frame number of the current picture (i.e., the picture that is currently being coded). A frame number of a picture is a value based on a picture number of the picture. The frame number of a picture may be used to identify the picture when the picture is used as a short-term reference picture.

As mentioned above, video coders (e.g., video encoder 20 and video decoder 30) may maintain a first reference picture list (list 0) and a second reference picture list (list 1). List 0 and list 1 may be lists of frame numbers of reference pictures. Video encoder 20 may signal that a video block is inter-predicted using a reference block in a particular reference picture by signaling a position in a reference picture list of the frame numbers of the particular reference picture.

Some video coders generate reference picture lists such that the frame numbers of temporal (i.e., intra-view) reference pictures are always initially listed first. The frame numbers of the temporal reference pictures are followed in the reference picture lists by the frame numbers of inter-view reference pictures. That is, a video coder may generate a reference picture using the following steps. First, the video coder may apply a reference picture list initialization process for temporal (i.e., intra-view) reference pictures as specified in the H.264/AVC standard, wherein reference pictures from other views are not considered. Second, the video coder may append inter-view reference pictures to the end of the reference picture list in an order that the inter-view reference pictures occur in the MVC SPS extension. Third, the video coder may apply a reference picture list modification (RPLM) process for both intra-view and inter-view reference pictures. For instance, a video encoder or a video decoder may perform a reference picture list modification process that changes a position in a reference picture list of an inter-view reference view component. Inter-view reference pictures may be identified in RPLM commands by their index values, as specified by the MVC SPS extension. The RPLM process is described in detail below.

In HEVC, a NAL unit header of a VCL NAL unit may be two bytes in length. In contrast, a NAL unit header of a VCL NAL unit in H.264/AVC may only be one byte in length. The first byte of the NAL unit header of a HEVC VCL NAL unit may have the same syntax and semantics as the NAL unit header of a H.264/AVC VCL NAL unit. When the second byte of the NAL unit header of a HEVC VCL NAL unit is present, the second byte of the NAL unit header of the HEVC VCL NAL unit may include a temporal identifier (e.g., "temporal_id") syntax element and an output flag (e.g., "output_flag") syntax element. The temporal identifier syntax element may specify a temporal identifier for the NAL unit. Each NAL unit that includes a coded slice of a view component of an access unit may have the same the temporal identifier. The output flag syntax element may affect output of a decoded picture associated with the NAL unit, as described in Annex C of HEVC.

Furthermore, after a video coder generates reference picture lists 0 and 1 in HEVC, the video coder may generate a combined reference picture list from reference pictures in reference picture lists 0 and 1. To generate the combined reference picture list, the video coder may select entries (i.e., reference pictures) from lists 0 and 1 and inserts (e.g., appends) the selected entries to the combined reference picture list. In some examples, the video coder may select the entries from list 0 and list 1 based on ascending order of occurrence in list 0 and list 1. If a selected entry is already in the combined reference picture list, the video coder does not insert the entry into the combined reference picture list again. The video coder may determine whether a selected entry is already in the combined reference picture list by checking picture order count (POC) numbers of the entries.

In HEVC, video encoder 20 signals a Reference Picture Set (RPS) for each coded picture. An RPS of a coded picture is set of reference pictures associated with the coded picture. The RPS may include, and in some examples consist of, all reference pictures that are prior to the coded picture in decoding order that may be used for inter prediction of the coded picture or any picture following the coded picture in decoding order.

Video encoder 20 may signal the RPS's of coded pictures in PPS's and slice headers. For instance, video encoder 20 may signal an RPS in a PPS and may signal in a slice header of a coded picture that the RPS of the coded picture is the RPS signaled in the PPS. In other instances, video encoder 20 may signal the RPS of a coded picture directly in a slice header of the coded picture. Accordingly, video decoder 30 may parse, from a slice header, the syntax elements indicating the RPS.

The RPS of a view component (i.e., the current view component) may be divided into five reference picture subsets: RefPicSetStCurr0, RefPicSetStCurr1, RefPicSetStFoll0, RefPicSetStFoll1, RefPicSetLtCurr, and RefPicSetLtFoll. Each of these reference picture subsets may comprise a list of POC values that identify reference view components. The terms "reference view components" and "reference pictures" may be used interchangeably in this disclosure. RefPicSetStCurr0 may consist of all short-term reference view components that are prior to the current view component in both decoding order and output order, and that may be used in inter prediction of the current view component. RefPicSetStCurr1 may consist of all short-term reference view components that are prior to the current view component in decoding order, that succeed the current view component in output order, and that may be used in inter prediction of the current view component. RefPicSetStFoll0 may consist of all short-term reference view components that are prior to the current view component in both decoding order and output order, that may be used in inter prediction of one or more of the view components following the current view component in decoding order, and that are not used in inter prediction of the current view component. RefPicSetStFoll1 may consist of all short-term reference view components that are prior to the current view component in decoding order, that succeed the current view component in output order, that may be used in inter prediction of one or more of the view component following the current view component in decoding order, and that are not used in inter prediction of the current view component. RefPicSetLtCurr may consist of all long-term reference view components that are prior to the current view component in decoding order and that may be used in inter prediction of the current view component. RefPicSetLtFoll may consist of all long-term reference view components that are prior to the current view component in decoding order, that may be used in inter prediction of one or more of view components following the current view component in decoding order, and that are not used in inter prediction of the current view component.

The number of entries in RefPicSetStCurr0, RefPicSetStCurr1, RefPicSetStFoll0, RefPicSetStFoll1, RefPicSetLtCurr, and RefPicSetLtFoll may be referred to in this disclosure as NumRpsStCurr0, NumRpsStCurr1, NumRpsStFoll0, NumRpsStFoll1, NumRpsLtCurr, and NumRpsLtFoll respectively. If the current view component is an IDR picture, RefPicSetStCurr0, RefPicSetStCurr1, RefPicSetStFoll0, RefPicSetStFoll1, RefPicSetLtCurr, and RefPicSetLtFoll are all empty, and NumRpsStCurr0, NumRpsStCurr1, NumRpsStFoll0, NumRpsStFoll1, NumRpsLtCurr, and NumRpsLtFoll are all equal to 0. Further description of reference pictures sets may be found in Boyce et al., "JCT-VC break-out report: Reference picture buffering and list construction (AHG21), document no. JCTVC-G1002, dated Nov. 11, 2011, which as of Dec. 19, 2012 is available from http://phenix.int-evry.fr/jct/doc_end_user/documents/7_Geneva/wg11/JCTVC-G1002-v5.zip, the entire content of which is incorporated herein by reference.

When a video coder codes a P or B slice, the video coder may generate initial versions of list 0 and list 1. In other words, the video coder may initialize list 0 and list 1. The video coder may generate the initial versions of list 0 and list 1 such that list 0 and list 1 include at least one reference picture from RefPicSetCurr0, RefPicSetCurr1, or RefPicSetLtCurr.

For instance, the video coder may perform an operation described by the following pseudo-code to generate the initial version of list 0.

```
cIdx = 0
while( cIdx <= num_ref_idx_l0_active_minus1 )
{
        for( i=0; i < NumRpsStCurr0 && cIdx <=
        num_ref_idx_l0_active_minus1; cIdx++, i++ )
                RefPicList0[ cIdx ] = RefPicSetStCurr0[ i ]
        for( i=0; i < NumRpsStCurr1 && cIdx <=
        num_ref_idx_l0_active_minus1; cIdx++, i++ )
                RefPicList0[ cIdx ] = RefPicSetStCurr1[ i ]
        for( i=0; i < NumRpsLtCurr && cIdx <=
        num_ref_idx_l0_active_minus1; cIdx++, i++ )
                RefPicList0[ cIdx ] = RefPicSetLtCurr[ i ]
}
```

In the pseudo-code above, cIdx is a counter variable. Furthermore, in the pseudo-code above, num_ref_idx_l0 active_minus1 is a value that indicates the number of active reference pictures in list 0, minus 1. When the video coder performs the pseudo-code above, the video coder inserts each reference picture of RefPicSetStCurr0 into reference picture list 0, then inserts each reference picture of RefPicSetStCurr1 into reference picture list 0, then inserts each reference picture of RefPicSetLtCurr into reference picture list 0.

The video coder may perform an operation described by the following pseudo-code to generate the initial version of list 1.

```
cIdx = 0
while( cIdx <= num_ref_idx_l1_active_minus1 )
{
        for( i=0; i < NumRpsStCurr1 && cIdx <=
        num_ref_idx_l1_active_minus1; cIdx++, i++ )
                RefPicList1[ cIdx ] = RefPicSetStCurr1[ i ]
        for( i=0; i < NumRpsStCurr0 && cIdx <=
        num_ref_idx_l1_active_minus1; cIdx++, i++ )
                RefPicList1[ cIdx ] = RefPicSetStCurr0[ i ]
        for( i=0; i < NumRpsLtCurr && cIdx <=
        num_ref_idx_l1_active_minus1; cIdx++, i++ )
                RefPicList1[ cIdx ] = RefPicSetLtCurr[ i ]
}
```

When the video coder performs the pseudo-code above, the video coder inserts each reference picture of RefPicSetStCurr0 into reference picture list 1, then inserts each reference picture of RefPicSetStCurr1 into reference picture list 1, then inserts each reference picture of RefPicSetLtCurr into reference picture list 1.

In some instances, it may be advantageous to change the order of reference pictures in a reference picture list. For instance, because positions may be signaled using unary values, fewer bits may be required to indicate the first position in a reference picture list than a last position in the reference picture list. Hence, if a particular reference picture is likely to be used frequently, it may be advantageous to have the particular reference picture closer to the first position of the reference picture list than to the last position in the reference picture list.

Accordingly, video encoder 20 may include a series of one or more RPLM commands in the bitstream. An RPLM command may be a set of one or more syntax elements for inserting a reference picture in a reference picture list. Thus, by including RPLM commands in the bitstream, video encoder 20 may flexibly arrange temporal and view prediction references, which may provide potential coding efficiency gains. In addition, the use of RPLM commands may increase error resilience because reference picture selection and redundant picture mechanisms may be extended to the view dimension.

Video decoder 30 processes the RPLM commands in the order the RPLM commands are signaled in the bitstream. Furthermore, when video decoder 30 processes a series of RPLM commands, video decoder 30 may initially set a current index value to 0 and may increment the current index value during processing of each RPLM command. When video decoder 30 processes a RPLM command, video decoder 30 may shift down in the reference picture list, by one position, the reference picture at the position indicated by the current index value and all reference pictures at positions following the position indicated by the current index value. Video decoder 30 may then insert a reference picture into the reference picture list at the position indicated by the current index value. Video decoder 30 may then scan through the reference picture list and remove, if present, a duplicate of the inserted reference picture.

RPLM commands may be specified in a slice header of a coded slice. Table 3, below, shows an example syntax for RPLM commands that may be included in a slice header.

TABLE 3

RPLM syntax

| | Descriptor |
|---|---|
| ref_pic_list_modification( ) { | |
|   if( slice_type != 2 ) { | |
|     ref_pic_list_modification_flag_l0 | u(1) |
|     if( ref_pic_list_modificationflag_l0 ) | |
|       do { | |
|         list_modification_idc | ue(v) |
|         if( list_modification_idc != 3 ) | |
|           ref_pic_set_idx | ue(v) |
|       } while( list_modification_idc != 3 ) | |
|   } | |
|   if( slice_type % 5 == 1 ) { | |
|     ref_pic_list_modification_flag_l1 | u(1) |
|     if( ref_pic_list_modification_flag_l1 ) | |
|       do { | |
|         list_modification_idc | ue(v) |
|         if( list_modification_idc != 3 ) | |
|           ref_pic_set_idx | ue(v) |
|       } while( list_modification_idc != 3 ) | |
|   } | |
| } | |

In Table 3, "slice_type" indicates a type of the current slice (i.e., the slice whose slice header includes the RPLM commands). Table 4, below, indicates example semantics of "slice_type."

TABLE 4

| slice_type | Name of slice_type |
|---|---|
| 0 | P (P slice) |
| 1 | B (B slice) |
| 2 | I (I slice) |

Furthermore, in the example syntax of Table 3, the "list_modification_idc" and "ref_pic_set_idx" syntax elements may specify changes from the initial versions of the reference picture lists to the versions of the reference picture lists that a video coder uses for inter prediction. The "ref_pic_list_modification_flag_10" syntax element indicates whether there are one or more "list_modification_idc" syntax elements to modify list 0. When the "ref_pic_list_modification_flag_10" syntax element is equal to 1, the number of times that the "list_modification_idc" syntax element is not equal to 3 may not exceed the number of active reference picture lists in list 0. The "ref_pic_list_modification_flag_11" syntax element indicates whether there are one or more "list_modification_idc" syntax elements to modify list 1. When "ref_pic_list_modification_flag_11" is equal to 1, the number of times that list_modification_idc is not equal to 3 may not exceed the number of active reference picture lists in list 1. The "long_term_pic_num" syntax element specifies a long-term frame number of a picture being moved to the current index of the reference picture list.

In general, the "ref_pic_set_idx" syntax element specifies an index to a position in RefPicSetStCurr0, RefPicSetStCurr1 or RefPicSetLtCurr of a reference picture to be moved to the current index in the reference picture list. The value of the "ref_pic_set_idx" syntax element may range from 0 to the maximum-allowable number of reference pictures, inclusive.

The "list_modification_idc" syntax element specifies a type of RPLM command to perform. For ease of explanation, this syntax element may be referred to as the RPLM type syntax element. In some examples, the RPLM type syntax element may have a value ranging from 0 to 3, inclusive. For list 0, if the RPLM type syntax element is equal to 0, the "ref_pic_set_idx" syntax element is present and the "ref_pic_set_idx" syntax element corresponds to an index to a position in RefPicSetStCurr0. For example, "ref_pic_set_idx" may indicate the reference picture at the second position in RefPicSetStCurr0. For list 1, if the RPLM type syntax element is equal to 0, the "ref_pic_set_idx" syntax element is present and the "ref_pic_set_idx" syntax element corresponds to an index to a position in RefPicSetStCurr1.

For list 0, if the RPLM type syntax element is equal to 1, the "ref_pic_set_idx" syntax element is present and the "ref_pic_set_idx" syntax element corresponds to an index to a position in RefPicSetStCurr1. For list 1, if the RPLM type syntax element is equal to 1, the "ref_pic_set_idx" syntax element is present and the "ref_pic_set_idx" syntax element corresponds to an index to a position in RefPicSetStCurr0.

If the RPLM type syntax element is equal to 2, the "ref_pic_set_idx" syntax element is present and the "ref_pic_set_idx" syntax element indicates an index to a position in RefPicSetLtCurr. If the RPLM type syntax element is equal to 3, the video coder stops the loop of modifying the reference picture list.

When the "ref_pic_list_modification_flag_10" syntax element is equal to 1, a video coder may process the "list_modification_idc" syntax elements in an order that they occur in the bitstream. For each "list_modification_idc" syntax element, the video coder may determine whether the "list_modification_idc" syntax element is equal to 0, 1, or 2. If the "list_modification_idc" syntax element is equal to 0, 1, or 2, the video coder may invoke a process to move one reference picture to a reference picture index. The video coder may provide an index refIdxL0 as input to the process and may set refIdxL0 to the output of the process. RefIdxL0 is an index into list 0. The video coder may initially set refIdxL0 to be equal to 0. The process to move one reference picture to a reference picture index is described below. Otherwise, if the "list_modification_idc" syntax element is equal to 3, the video coder stops the reference picture list modification process for list 0.

When a current slice is a B slice and the "ref_pic_list_modification_flag_11" syntax element is equal to 1, the video coder may process the "list_modification_idc" syntax elements in an order that they occur in the bitstream. For each "list_modification_idc" syntax element, the video coder may determine whether the "list_modification_idc" syntax element is equal to 0, 1, or 2. If the "list_modification_idc" syntax element is equal to 0, 1, or 2, the video coder may invoke a process to move one reference picture to a reference picture index. The video coder may provide an index refIdxL1 as input to the process and may set refIdxL1 to the output of the process. RefIdxL1 is an index into list 1. The video coder may initially set refIdxL1 to be equal to 0. The process to move one reference picture to a reference picture index is described below. Otherwise, if the "list_modification_idc" syntax element is equal to 3, the video coder stops the reference picture list modification process for list 1.

As mentioned above, a video coder may perform a process to move a reference picture to a reference picture index. This process may take the reference picture index as input and output an incremented reference picture index. The reference picture index may be denoted as refIdxLX, where X is equal to 0 for movement of a reference picture in list 0 and X is equal to 1 for movement of a reference picture in list 1. If the "list_modification_idc" syntax element is equal to 0 and the current reference picture list is list 0, the video decoder may designate RefPicSetStCurr0 as the current reference picture set. Otherwise, if the "list_modification_idc" syntax element is equal to 0 and the current reference picture list is list 1, the video coder may designate RefPicStCurr1 as the current reference picture set. If the "list_modification_idc" syntax element is equal to 1 and the current reference picture list is list 0, the video coder may designate RefPicStCurr1 as the current reference picture set. If the "list_modification_idc" syntax element is equal to 1 and the current reference picture list is list 1, the video coder may designate RefPicStCurr0 as the current reference picture set. If the "list_modification_idc" syntax element is equal to 2, the video coder may designate RefPicSetLtCurr as the current reference picture set.

Furthermore, in the process to move a reference picture to a reference picture index, the video coder may determine a relevant POC value, pocLX. The relevant POC value may be the POC value of a reference picture to insert into reference picture list X (where X is 0 or 1) at the position in the current reference picture set indicated by the "ref_pic_set_idx" syntax element. In addition, the video coder may perform a process described by the following pseudo-code to insert a picture having the relevant POC value into the current reference picture list at the position indicated by refIdxLX.

```
for( cIdx = num_ref_idx_lX_active_minus1 + 1; cIdx > refIdxLX; cIdx-- )
    RefPicListX[ cIdx ] = RefPicListX[ cIdx - 1]
RefPicListX[ refIdxLX++ ] = pocLX
nIdx = refIdxLX
for( cIdx = refIdxLX; cIdx <= num_ref_idx_lX_active_minus1 + 1; cIdx++ )
    if( PicOrderCnt( RefPicListX[ cIdx ] ) != pocLX )
        RefPicListX[ nIdx++ ] = RefPicListX[ cIdx ]
```

In the pseudo-code above cIdx is a counter variable. Furthermore, in the pseudo-code above, num_ref_idx_1X_active_minus1 is a variable equal to the number of active reference pictures in the current reference picture list, minus 1. PicOrderCnt is a function that returns a POC value of a reference picture. When the video coder performs the process described by the pseudo-code above, the video coder may shift the reference pictures following the position indicated by refIdxLX to positions later in the current reference picture list, insert the reference picture with the relevant POC value, increment refIdxLX, and remove from the reference picture list any duplicate of the reference picture with the relevant POC value.

In the pseudo-code above, the length of the current reference picture list may temporarily be one element longer than the length of the final version of the current reference picture list. Accordingly, after the video coder performs the operation described by the pseudo-code above, the video coder may retain only elements 0 through num_ref_idx_1X_active_minus1 in the final version of current reference picture list.

U.S. Provisional Patent Application No. 61/512,771, the entire content of which is incorporated herein by reference, describes an extension of HEVC to include coding of multiple texture views, similar to the MVC extension of H.264/AVC. That is, U.S. Provisional Patent Application No. 61/512,771, describes the use in HEVC of inter-view prediction (i.e., disparity motion compensation), similar to that used in H.264/AVC. Furthermore, in U.S. Provisional Patent Application No. 61/512,771, a video encoder may signal, in a SPS, view identifiers of view components upon which non-base views are dependent. Table 5, below, is a portion of a syntax of an SPS to signal view dependencies of non-base views.

TABLE 5

```
for( i = 1; i <= num_views_minus1; i++ ) {
    num_ref views[ i ]                              ue(v)
    for( j = 0; j < num_ref_views[ i ]; j++ )
        ref_view_idx[ i ][ j ]                      ue(v)
}
```

In Table 5, above, the "ref_view_idx[i][j]" syntax elements indicate view order indexes of the j-th view component for inter-view prediction in the initial versions of reference picture list 0 and reference picture list 1 for decoding a view component with view order index equal to i. In U.S. Provisional Patent Application No. 61/512,771, reference picture list construction follows the same procedure as in H.264/MVC. However, in U.S. Provisional Patent Application No. 61/512,771, video encoder 20 may use the same signaling, regardless of whether the current picture is an anchor picture or non-anchor picture and whether the current list is RefPicList0 or RefPicList1. In this way, two indications for RPLM commands may be used and the difference of the inter-view reference index may be used to identify an inter-view reference picture.

There may be several problems with the video coders described above. For example, signaling of inter-view reference view components may be inefficient or missing. In another example, the reference picture list initialization process may be inefficient. In another example, the reference picture list modification process may be inefficient.

The techniques of this disclosure may remedy these problems. In accordance with the techniques of this disclosure, a video coder derives a RPS for a current view component. The RPS of the current view component may include the reference picture subsets: RefPicSetStCurr0, RefPicSetStCurr1, RefPicSetStFoll0, RefPicSetStFoll1, RefPicSetLtCurr, RefPicSetLtFoll. In addition, the RPS of the current view component may include an inter-view reference picture set (RefPicSetInterView). The inter-view prediction reference picture set includes view components that are not from a same view as the current view component, that also are from a same access unit as the current view component, and that also are used by the current view component for inter-view prediction reference. In some examples, the inter-view reference picture set is signaled at a sequence level and may be shared by all view components of the same view. RefPicSetStCurr0, RefPicSetStCurr1, RefPicSetStFoll0, RefPicSetStFoll1, RefPicSetLtCurr, and RefPicSetLtFoll include reference view components that are from the same view as the current view component, are prior to the current view component in decoding order, and may be used for inter prediction of the current view component or any view component from the same view following the current view component in decoding order. RefPicSetStCurr0, RefPicSetStCurr1, RefPicSetStFoll0, RefPicSetStFoll1, RefPicSetLtCurr, and RefPicSetLtFoll may be referred to herein as the intra-view reference picture set.

In one example, video encoder 20 may derive RefPicSetInterView using the following pseudo-code:

```
for( j = 0; j < num_ref_views[ VOIdx ]; j++ )
    RefPicSetInterView[ j ] = ref_view_idx[ VOIdx ][ j ]
NumRpsInterView = j
```

In the pseudo-code above, VOIdx indicates the view order index of the current view component.

In another example, video encoder 20 may derive RefPicSetInterView using the following pseudo-code:

```
if( all_inter_view_refs_flag ) {
    for( j = 0; j < num_ref_views[ VOIdx ]; j++ )
        RefPicSetInterView[ j ] = ref_view_idx[ VOIdx ][ j ]
    NumRpsInterView = j
}
else if( no_inter_view_refs_flag )
    NumRpsInterView = 0 // RefPicSetInterView is empty
else {
    for( j = 0, jj = 0; jj < num_ref_views[ VOIdx ]; jj++ )
        if( ref_view_flag[ VOIdx ][ jj ] )
            RefPicSetInterView[ j++ ] = ref_view_idx[ VOIdx ][ jj ]
    NumRpsInterView = j
}
```

In the pseudo-code above, the ref_view_flag[VOIdx][j] values for all j values are from the syntax structure inter_view_rps(i, inter_view_rps_idx) in the active sequence parameter set.

For instance, video encoder 20 may generate, based on a reference picture set of a current view component of an access unit, a reference picture list for the current view component. The reference picture set may include an inter-view reference picture set that includes a plurality of view components that belong to the access unit and that are associated with different views. Furthermore, video encoder 20 may encode the current view component based on one or more reference pictures in the reference picture list. Video encoder 20 may generate a bitstream that includes syntax elements indicating the reference picture set of the current view component.

Furthermore, in accordance with the techniques of this disclosure, video decoder 30 may parse, from a bitstream, syntax elements indicating a reference picture set of a current view component of an access unit, the reference picture set including an inter-view reference picture set that includes a plurality of view components that belong to the access unit and that are associated with different views. Video decoder 30 may generate, based on the reference picture set, a reference picture list for the current view component. In addition, video decoder 30 may decode the current view component based at least in part on one or more reference pictures in the reference picture list.

When a video coder (such as video encoder 20 or video decoder 30) initializes reference picture lists 0 and 1 for the current view component, the video coder includes reference view components from RefPicSetInterView in reference picture lists 0 and 1. In some examples, the video coder generates reference picture lists 0 and 1 such that reference picture lists 0 and 1 include each view component of the inter-view reference picture set (RefPicSetInterView). The video coder may include reference view components from RefPicSetInterView at various locations in reference picture lists 0 and 1 according to various predefined orders.

In a first example order, the video coder initializes reference picture list 0 such that view components in RefPicSetStCurr0 are listed first, followed by view components in RefPicSetInterView, view components in RefPicSetStCurr1, and view components in RefPicSetLtCurr. In this example, the video coder initializes reference picture list 1 such that view components in RefPicSetStCurr1 are listed first, followed by view components in RefPicSetInterView, view components in RefPicSetStCurr0, and view components in RefPicSetLtCurr. Thus, in this example, video decoder 30 may generate a reference picture list (e.g., list 0 or list 1) such that a first subset (i.e., RefPicSetStCurr0) or a second subset (i.e., RefPicSetStCurr1) occurs first in the reference picture list, followed by the inter-view reference picture set (i.e., RefPicSetInterView).

In a second example order, the video coder initializes reference picture list 0 such that view components in RefPicSetStCurr0 are listed first, followed by view components in RefPicSetStCurr1, view components in RefPicSetInterView, and view components in RefPicSetLtCurr. In this example, the video coder initializes reference picture list 1 such that view components in RefPicSetStCurr1 are listed first, followed by view components in RefPicSetStCurr0, view components in RefPicSetInterView, and view components in RefPicSetLtCurr. Thus, in this example, video decoder 30 may generate a reference picture list (e.g., list 0 or list 1) such that a first subset (i.e., RefPicSetStCurr0) and a second subset (i.e., RefPicSetStCurr1) occur in the reference picture list, followed by the inter-view reference picture set (i.e., RefPicSetInterView).

In a third example order, the video coder initializes reference picture list 0 such that view components in RefPicSetStCurr0 are listed first, followed by view components in RefPicSetStCurr1, view components in RefPicSetLtCurr, and view components in RefPicSetInterView. In this example, the video coder initializes reference picture list 1 such that view components in RefPicSetStCurr1 are listed first, followed by view components in RefPicSetStCurr0, view components in RefPicSetLtCurr, and view components in RefPicSetInterView. Thus, in this third example, the view components of the RefPicSetInterView (the inter-view reference picture set) occur last in the reference picture lists 0 and 1. That is, in this example, video decoder 30 may generate a reference picture list (e.g., list 0 or list 1) such that a first subset (i.e., RefPicSetStCurr0), a second subset (i.e., RefPicSetStCurr1), a fifth subset (i.e., RefPicSetLtCurr) occur in the reference picture list, followed by the inter-view reference picture set (i.e., RefPicSetInterView).

In some examples, RefPicSetInterView is subdivided into two subsets: RefPicSetInterViewFwd and RefPicSetInterViewBwd. RefPicSetInterViewFwd includes those reference view components of RefPicSetInterView that have view identifiers less than a view identifier of the current view component. RefPicSetInterViewBwd includes those reference view components of RefPicSetInterView that have view identifiers greater than the view identifier of the current view component. The order of the view components in RefPicSetInterViewFwd and the order of the views in RefPicSetInterViewBwd are the same as signaled in a corresponding SPS. That is, for any view A and view B, if the views A and B both have view_id values greater than the view_id of the current view and view A precedes view B in the SPS, then a view component of view A precedes a view component of view B in RefPicSetInterViewBwd. If views A and B both have view_id values less than the view_id of the current view and view A precedes view B in the SPS, then the view component of view A precedes the view component of view B in RefPicSetInterViewFwd.

In other examples, RefPicSetInterViewFwd includes those reference view components of RefPicSetInterView that have view order indexes less than a view order index of the current view component. RefPicSetInterViewBwd includes those reference view components of RefPicSetInterView that have view order indexes greater than the view order index of the current view component. The order of the view components in RefPicSetInterViewFwd and the order of the views in RefPicSetInterViewBwd are the same as signaled in a corresponding SPS. That is, for any view A and view B, if the views A and B both have view order index values greater than the view order index of the current view and view A precedes view B in the SPS, then a view component of view A precedes a view component of view B in RefPicSetInterViewBwd. If views A and B both have view order index values less than the view order index of the current view and view A precedes view B in the SPS, then the view component of view A precedes the view component of view B in RefPicSetInterViewFwd.

In some examples, RefPicSetInterView is derived by using view dependency syntax elements as signaled in the sequence parameter set MVC extension of MVC. In such examples, RefPicSetInterViewFwd may be derived to be equal to anchor_ref_10[i][j] when the current view component belongs to an anchor access unit, which is equivalent to a clean random access (CRA) access unit. RefPicSetInterViewFwd may be derived to be equal to non_anchor_ref_10[i][j] when the current view component belongs to a non-anchor access unit, for all j values. RefPicSetInterViewBwd is derived to be equal to anchor_ref_11[i][j] when the current view component belongs to an anchor access unit, which is equivalent to a CRA access unit. RefPicSetInterViewBwd may be derived to be equal to non_anchor_ref_10[i][j] when the current view component belongs to a non-anchor access unit, for all j values.

In some examples where RefPicSetInterView is subdivided into RefPicSetInterViewFwd and RefPicSetInterViewBwd, the video coder may initialize reference picture list 0 such that reference picture list 0 includes reference view components from RefPicSetStCurr0, RefPicSetStCurr1, RefPicSetLtCurr, and RefPicSetInterViewFwd, but not reference view components from RefPicSetInterviewBwd. The video coder may initialize reference picture list 1 such that reference picture list 1 includes reference view components from RefPicSetStCurr0, RefPicSetStCurr1, RefPicSetLtCurrn and RefPicSetInterViewBwd, but not reference view components from RefPicSetInterViewFwd.

Thus, the video coder may generate a first reference picture list (e.g., list 0) such that the first reference picture list includes a first subset of the inter-view reference pictures (e.g., RefPicInterViewFwd) and not a second subset of the inter-view reference pictures (e.g., RefPicInterViewBwd). Furthermore, the video coder may generate a second reference picture list (e.g., list 1) such that the second reference picture list includes the second subset of the inter-view reference pictures (e.g., RefPicInterViewBwd) and not the first subset of the inter-view reference pictures (e.g., RefPicInterViewFwd).

Alternatively, in some examples where RefPicSetInterView is subdivided into RefPicSetInterViewFwd and RefPicSetInterViewBwd, the video coder may initialize reference picture lists 0 and 1 according to the first, second, or third example orders described above. However, when the video coder includes inter-view reference view components in reference picture list 0, the video coder may include each inter-view reference view component from RefPicSetInterViewFwd before inter-view reference view components from RefPicSetInterViewBwd. When the video coder includes inter-view reference view components in reference picture list 1, the video coder may include each inter-view reference view component from RefPicSetInterViewBwd before any inter-view reference view components from RefPicSetInterViewFwd.

In some examples, a video coder may generate reference picture lists 0 and 1 such that the reference picture lists include a set of one or more VSRPs. The video coder may include the VSRPs at various positions within reference picture lists 0 and 1. For example, the video coder may initialize reference picture lists 0 and 1 such that the VSRPs are immediately after the inter-view reference view components. In other words, the video coder may generate reference picture lists 0 and 1 such that the set of VSRPs follows, in reference picture lists 0 and/or 1, the inter-view reference picture set. In another example, the video coder may initialize reference picture lists 0 and 1 such that the VSPRs are immediately before (i.e., precedes) the inter-view reference picture set.

Figure 4:
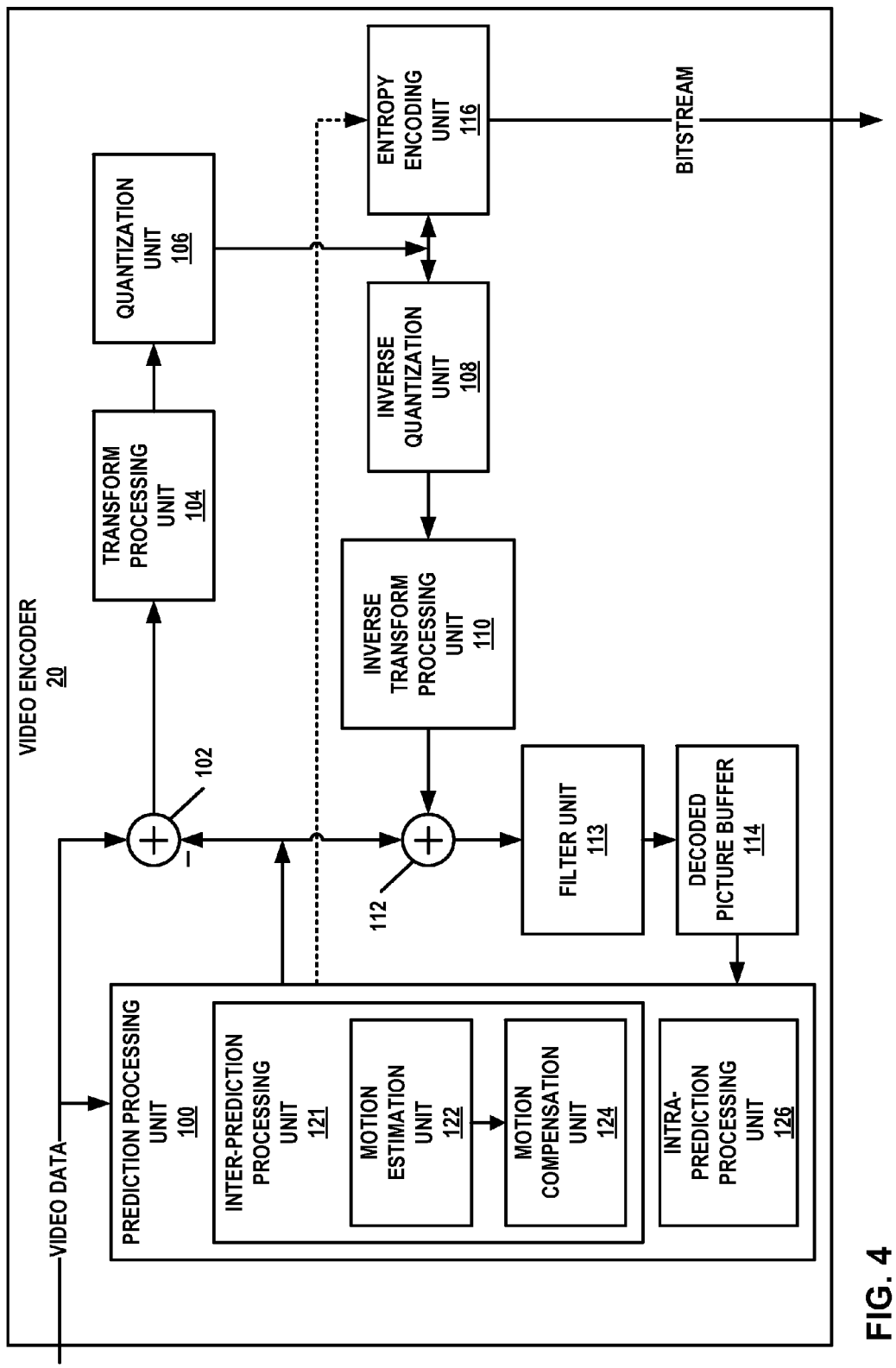
FIG. 4 is a block diagram illustrating an example video encoder that may implement the techniques described in this disclosure.

In the context of 3D video coding, where a view component may contain both texture and depth view components, a texture or depth view component of a specific view of a specific access unit may be further identified with an indication. In one example, this indication is a flag in a NAL unit header. In another example, this indication is based on types of NAL units. The techniques of this disclosure, including the use of an inter-view reference picture set, the reference picture set construction techniques of this disclosure, reference picture list initialization techniques of this disclosure, and reference picture list modification techniques of this disclosure, may apply to both texture view components and depth view components, FIG. 4 is a block diagram that illustrates an example video encoder 20 that is configured to implement the techniques of this disclosure. FIG. 4 is provided for purposes of explanation and should not be considered limiting of the techniques as broadly exemplified and described in this disclosure. For purposes of explanation, this disclosure describes video encoder 20 in the context of HEVC coding, and the MVC and 3DV extensions of HEVC. However, the techniques of this disclosure may be applicable to other coding standards or methods.

In the example of FIG. 4, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 113, a decoded picture buffer 114, and an entropy encoding unit 116. Prediction processing unit 100 includes an inter-prediction processing unit 121 and an intra-prediction processing unit 126. Inter-prediction processing unit 121 includes a motion estimation unit 122 and a motion compensation unit 124. In other examples, video encoder 20 may include more, fewer, or different functional components.

Video encoder 20 receives video data. To encode the video data, video encoder 20 may encode each slice of each picture (e.g., texture view component or depth view component) of the video data. As part of encoding a slice, video encoder 20 may encode each CTB in the slice. As part of encoding a CTB, prediction processing unit 100 may perform quad-tree partitioning on the pixel block associated with the CTB to divide the pixel block into progressively-smaller pixel blocks. For example, prediction processing unit 100 may partition the pixel block of a CTB into four equally-sized sub-blocks, partition one or more of the sub-blocks into four equally-sized sub-sub-blocks, and so on. The smaller pixel blocks may be associated with CUs of the CTB.

Video encoder 20 may encode CUs of a CTB to generate encoded representations of the CUs (i.e., coded CUs). As part of encoding a CU, prediction processing unit 100 may partition the pixel block of the CU among one or more PUs of the CU. Video encoder 20 and video decoder 30 may support various PU sizes. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 121 may generate reference picture lists for slices of view components. In addition, inter-prediction processing unit 121 may generate predictive data for a PU by performing inter prediction on each PU of a CU. The predictive data for the PU may include a predictive pixel block that corresponds to the PU and motion information for the PU. Slices may be I slices, P slices, or B slices. Inter-prediction unit 121 may perform different operations for a PU of a CU depending on whether the PU is in an I slice, a P slice, or a B slice. In an I slice, all PUs are intra predicted. Hence, if the PU is in an I slice, inter-prediction unit 121 does not perform inter prediction or inter-view prediction on the PU.

If a PU is in a P slice, motion estimation unit 122 may search the reference pictures in a list of reference pictures (e.g., "list 0") for a reference block for the PU. List 0 may include one or more inter-view reference pictures. The reference block of the PU may be a pixel block that most closely corresponds to the pixel block of the PU. Motion estimation unit 122 may generate a reference picture index that indicates the reference picture in list 0 containing the reference block of the PU and a motion vector that indicates a spatial displacement between the pixel block of the PU and the reference block. Motion estimation unit 122 may output the reference picture index and the motion vector as the motion information of the PU. Motion compensation unit 124 may generate the predictive pixel block of the PU based on the reference block indicated by the motion information of the PU.

If a PU is in a B slice, motion estimation unit 122 may perform uni-directional inter prediction or bi-directional inter prediction for the PU. To perform uni-directional inter prediction for the PU, motion estimation unit 122 may search the reference pictures of a first reference picture list ("list 0") or a second reference picture list ("list 1") for a reference block for the PU. List 0 and/or list 1 may include one or more inter-view reference pictures. Motion estimation unit 122 may output, as the motion information of the PU, a reference picture index that indicates a position in list 0 or list 1 of the reference picture that contains the reference block, a motion vector that indicates a spatial displacement between the pixel block of the PU and the reference block, and a prediction direction indicator that indicates whether the reference picture is in list 0 or list 1.

To perform bi-directional inter prediction for a PU, motion estimation unit 122 may search the reference pictures in list 0 for a reference block for the PU and may also search the reference pictures in list 1 for another reference block for the PU. Motion estimation unit 122 may generate reference picture indexes that indicate positions in list 0 and list 1 of the reference pictures that contain the reference blocks. In addition, motion estimation unit 122 may generate motion vectors that indicate spatial displacements between the reference blocks and the pixel block of the PU. The motion information of the PU may include the reference picture indexes and the motion vectors of the PU. Motion compensation unit 124 may generate the predictive pixel block of the PU based on the reference blocks indicated by the motion information of the PU.

Inter-prediction processing unit 121 may signal the reference picture set (RPS) applicable to a slice. Inter-prediction processing unit 121 may, in accordance with the techniques of this disclosure, signal the inter-view reference view components of the RPS in various ways. For example, inter-prediction processing unit 121 may signal the inter-view reference view components as described in the MVC extension. In another example, inter-prediction processing unit 121 may signal the inter-view reference view components as described in U.S. Provisional Patent Application 61/512,771.

In another example, inter-prediction processing unit 121 may signal inter-view reference view components by including the syntax structure of Table 6, below, in a SPS.

TABLE 6

| for( i = 1; i <= num_views_minus1; i++ ) {        |       |
|---------------------------------------------------|-------|
| num_ref_views[ i ]                                | ue(v) |
| for( j = 0; j < num_ref_views[ i ]; j++ )         |       |
| ref_view_idx[ i ][ j ]                            | ue(v) |
| }                                                 |       |
| for( i = 1; i <= num_views_minus1; i++ ) {        |       |
| num_inter_view_rps[ i ]                           | ue(v) |
| for( k = 0; k < num_inter_view_rps[ i ]; k++ )    |       |
| inter_view_rps( i, k )                            |       |
| }                                                 |       |

In the example syntax structure of Table 6, the num_ref_views[i] syntax elements and the ref_view_idx[i][j] syntax elements may have the same semantics as those in U.S. Provisional Patent Application 61/512,771. That is, the "num_ref_views[i]" syntax element may specify the number of view components for inter-view prediction in the initial versions of list 0 and list 1 in decoding view components with view order index equal to i. The "ref_view_idx[i][j]" syntax elements may specify the view order index of the j-th view component in the initial versions of list 0 and list 1 in decoding a view component with view order index equal to i. The num_inter_view_rps[i] syntax element may specify the number of the following inter_view_rps[i] syntax structures.

Alternatively, inter-prediction processing unit 121 may include the syntax of Table 7 in a PPS instead of a SPS, as in the example of Table 6.

TABLE 7

| for( i = 1; i <= num_views_minus1; i++ ) {        |       |
|---------------------------------------------------|-------|
| num_inter_view_rps[ i ]                           | ue(v) |
| for( k = 0; k < num_inter_view_rps[ i ]; k++ )    |       |
| inter_view_rps( i, k )                            |       |
| }                                                 |       |

In the examples of Tables 6 and 7, the "inter_view_rps(i, k)" syntax structure may be expanded as shown in Table 8, below.

TABLE 8

| inter_view_rps( i, k )                            |       |
|---------------------------------------------------|-------|
| {                                                 |       |
| for( j = 0; j < num_ref_views[ i ]; j++ )         |       |
| ref_view_flag[ i ][ j ]                           | u(1)  |
| }                                                 |       |

In the example syntax structure of Table 8, if the "ref_view_flag[i][j]" syntax element is equal to 1, inter-prediction processing unit 121 may include a view component with view order index equal to "ref_view_idx[i][j]" in a reference picture set. If the "ref_view_flag[i][j]" syntax element is equal to 0, the view component with view order index equal to "ref_view_idx[i][j]" is not to be included in the reference picture set.

Furthermore, inter-prediction processing unit 121 may include the syntax structure of Table 9, below, in a slice header.

TABLE 9

| all_inter_view_refs_flag               | u(1)  |
|----------------------------------------|-------|
| if( !all_inter_view_refs_flag ) {      |       |
| no_inter_view_ref_flag                 | u(1)  |
| if( !no_inter_view_ref_flag )          |       |
| inter_view_rps_idx                     | ue(v) |
| }                                      |       |

In the example syntax of Table 9, if the "all_inter_view_refs_flag" syntax element is equal to 1, all view components identified by the "ref_view_idx[i][j]" syntax elements in the SPS are, for each value of j, included in the RPS of the current view component. If the "all_inter_view_refs_flag" syntax element is not equal to 1, the RPS of the current view component may include a subset of the view components identified by the "ref_view_idx[i][j]" syntax elements in the SPS.

Furthermore, in the example syntax of Table 9, if the "all_inter_view_refs_flag" syntax element is not equal to 1, the slice header may include a "no_inter_view_ref_flag" syntax element. If the "no_inter_view_ref_flag" syntax element is equal to 1, the RPS of the current view component does not include any inter-view reference pictures. If the "no_inter_view_ref_flag" syntax element is equal to 0, the RPS of the current view component may include one or more inter-view reference pictures. Furthermore, if the "no_inter_view_ref_flag" syntax element is equal to 0, the slice header may include an "inter_view_rps_idx" syntax element. The "inter_view_rps_idx" syntax element may specify an index of an inter-view reference picture set in the "inter_view_rps(i, k)" syntax structures of the SPS associated with the current view component. In this way, the RPS of the current view component may include the inter-view reference pictures in the "inter_view_rps(i, inter_view_rps_idx)" syntax structure.

Intra-prediction processing unit 126 may generate predictive data for a PU by performing intra prediction on the PU. The predictive data for the PU may include a predictive pixel block for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. To use an intra prediction mode to generate a set of predictive data for the PU, intra-prediction processing unit 126 may extend samples from sample blocks of neighboring PUs across the sample blocks of the PU in a direction associated with the intra prediction mode. The neighboring PUs may be above, above and to the right, above and to the left, or to the left of the PU, assuming a left-to-right, top-to-bottom encoding order for PUs, CUs, and CTBs. Intra-prediction processing unit 126 may use various numbers of intra prediction modes, e.g., 33 directional intra prediction modes. In some examples, the number of intra prediction modes may depend on the size of the pixel block of the PU.

Prediction processing unit 100 may select the predictive data for PUs of a CU from among the predictive data generated by inter-prediction processing unit 121 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive pixel blocks of the selected predictive data may be referred to herein as the selected predictive pixel blocks.

Residual generation unit 102 may generate, based on the pixel block of a CU and the selected predictive pixel blocks of the PUs of the CU, a residual pixel block of a CU. For instance, residual generation unit 102 may generate the residual pixel block of the CU such that each sample in the residual pixel block has a value equal to a difference between a sample in the pixel block of the CU and a corresponding sample in a selected predictive pixel block of a PU of the CU.

Transform processing unit 104 may perform quad-tree partitioning to partition the residual pixel block of a CU into sub-blocks. Each undivided residual pixel block may be associated with a different TU of the CU. The sizes and positions of the residual pixel blocks associated with TUs of a CU may or may not be based on the sizes and positions of pixel blocks associated with the PUs of the CU. A quad-tree structure known as a "residual quad-tree" (RQT) may include nodes associated with each of the residual pixel blocks. The TUs of a CU may correspond to leaf nodes of the RQT.

Because the pixels of the residual pixel blocks of the TUs may comprise a Y sample, a U sample, and a V sample, each of the TUs may be associated with a block of Y samples, a block of U samples, and a block of V samples. A U sample may indicate a difference between a blue component of a pixel and a Y sample for the pixel. For this reason, a U sample may also be referred to as a Cb sample. A V sample may indicate a difference between a red sample of a pixel and a Y sample for the pixel. For this reason, a V sample may also be referred to as a Cr sample.

Transform processing unit 104 may generate coefficient blocks for each TU of a CU by applying one or more transforms to the residual sample blocks associated with the TU. Transform processing unit 104 may apply various transforms to a residual sample block associated with a TU. For example, transform processing unit 104 may apply a discrete cosine transform (DCT), a directional transform, or a conceptually similar transform to a residual sample block.

Transform processing unit 104 may determine a transform to apply based on a size of the residual sample block to which the transform is to be applied. For example, transform processing unit 104 may apply different transforms depending on whether the residual sample block is 4×4, 8×8, 16×16, another size. In some examples, transform processing unit 104 may apply transforms to rectangular-shaped residual sample blocks, such as residual samples blocks that are 16×4, 32×8, and so on.

Quantization unit 106 may quantize the coefficients in a coefficient block associated with a TU. The quantization process may reduce the bit depth associated with some or all of the coefficients. For example, an n-bit coefficient may be rounded down to an m-bit coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU.

Inverse quantization unit 108 and inverse transform processing unit 110 may apply inverse quantization and inverse transforms to a coefficient block, respectively, to reconstruct a residual sample block from the coefficient block. Reconstruction unit 112 may add the reconstructed residual sample block to corresponding samples from one or more predictive sample blocks generated by prediction processing unit 100 to produce a reconstructed sample block associated with a TU. By reconstructing sample blocks for each TU of a CU in this way, video encoder 20 may reconstruct the pixel block of the CU.

Filter unit 113 may perform a deblocking operation to reduce blocking artifacts in the pixel block associated with a CU. Decoded picture buffer 114 may store the reconstructed pixel blocks after filter unit 113 performs the one or more deblocking operations on the reconstructed pixel blocks. Inter-prediction unit 121 may use a reference picture that contains the reconstructed pixel blocks to perform inter prediction on PUs of other pictures. In addition, intra-prediction processing unit 126 may use reconstructed pixel blocks in decoded picture buffer 114 to perform intra prediction on other PUs in the same picture as the CU.

Entropy encoding unit 116 may receive data from other functional components of video encoder 20. For example, entropy encoding unit 116 may receive coefficient blocks from quantization unit 106 and may receive syntax elements from prediction processing unit 100. Entropy encoding unit 116 may perform one or more entropy encoding operations on the data to generate entropy-encoded data. For example, entropy encoding unit 116 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 116.

Figure 5:
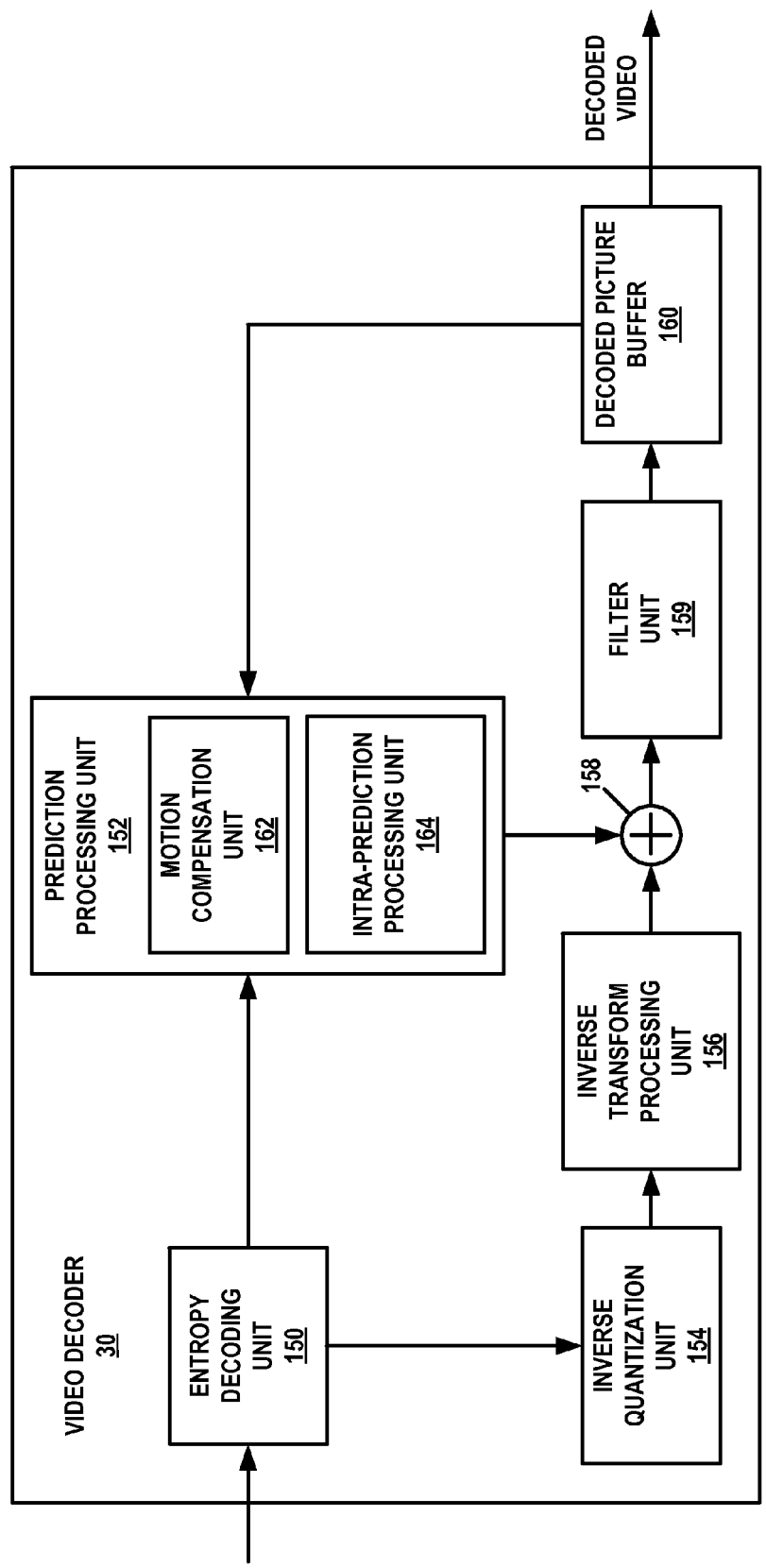
FIG. 5 is a block diagram illustrating an example video decoder that may implement the techniques described in this disclosure.

FIG. 5 is a block diagram illustrating an example video decoder 30 that is configured to implement the techniques of this disclosure. FIG. 5 is provided for purposes of explanation and is not limiting on the techniques as broadly exemplified and described in this disclosure. For purposes of explanation, this disclosure describes video decoder 30 in the context of HEVC coding, and the MVC and 3DV extensions of HEVC. However, the techniques of this disclosure may be applicable to other coding standards or methods.

In the example of FIG. 5, video decoder 30 includes an entropy decoding unit 150, a prediction processing unit 152, an inverse quantization unit 154, an inverse transform processing unit 156, a reconstruction unit 158, a filter unit 159, and a decoded picture buffer 160. Prediction processing unit 152 includes a motion compensation unit 162 and an intra-prediction processing unit 164. In other examples, video decoder 30 may include more, fewer, or different functional components.

Video decoder 30 may receive a bitstream. Entropy decoding unit 150 may parse the bitstream to extract syntax elements from the bitstream. As part of parsing the bitstream, entropy decoding unit 150 may entropy decode entropy-encoded syntax elements in the bitstream. Prediction processing unit 152, inverse quantization unit 154, inverse transform processing unit 156, reconstruction unit 158, and filter unit 159 may generate decoded video data based on the syntax elements extracted from the bitstream.

The bitstream may comprise a series of NAL units. The NAL units of the bitstream may include coded slice NAL units. As part of parsing the bitstream, entropy decoding unit 150 may extract and entropy decode syntax elements from the coded slice NAL units. Each of the coded slices may include a slice header and slice data. The slice header may contain syntax elements pertaining to a slice of a view component.

The syntax elements in the slice header may include a syntax element that identifies a PPS associated with a picture (i.e., a texture view component or a depth view component) that contains the slice.

In addition, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct a residual pixel block associated with the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply.

After inverse quantization unit 154 inverse quantizes a coefficient block, inverse transform processing unit 156 may apply one or more inverse transforms to the coefficient block in order to generate a residual sample block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 164 may perform intra prediction to generate a predictive sample block for the PU. Intra-prediction processing unit 164 may use an intra prediction mode to generate the predictive pixel block for the PU based on the pixel blocks of spatially-neighboring PUs. Intra-prediction processing unit 164 may determine the intra prediction mode for the PU based on one or more syntax elements parsed from the bitstream.

When video decoder 30 is decoding a P or B slice, prediction processing unit 152 may generate, based on syntax elements extracted from the bitstream, a first reference picture list (list 0) and a second reference picture list (list 1) for the P or B slice. If a PU is encoded using inter prediction, motion compensation unit 162 may generate, based on one or more reference blocks for the PU, a predictive pixel block for the PU. To determine a reference block for the PU, motion compensation unit 162 may determine, based on a reference picture index of the PU, a reference picture in a reference picture list for the slice associated with the PU. In addition, motion compensation unit 162 may identify, based on a motion vector of the PU, a reference block in the identified reference picture.

To generate list 0 and list 1, prediction processing unit 152 may perform an initialization process for list 0 and an initialization process for list 1. In various examples, prediction processing unit 152 may perform various initialization processes.

In one example, prediction processing unit 152 may insert inter-view reference pictures into list 0 immediately after the reference pictures of RefPicSetStCurr0. In this example, prediction processing unit 152 may insert inter-view reference pictures into list 1 immediately after the reference pictures of RefPicSetCurr1. In this example initialization process, both list 0 and list 1 include at least one reference picture from RefPicSetStCurr0, RefPicSetStCurr1, RefPicSetLtCurr, or RefPicSetInterView. The following pseudo-code describes an example initialization process for list 0.

```
cIdx = 0
while( cIdx <= num_ref_idx_l0_active_minus1 )
{
    for( i=0; i < NumRpsStCurr0 &&
    cIdx <= num_ref_idx_l0_active_minus1; cIdx++, i++ )
        RefPicList0[ cIdx ] = pic( RefPicSetStCurr0[ i ], VOIdx )
    for( i=0; i < NumRpsInterView &&
    cIdx <= num_ref_idx_l0_active_minus1; cIdx++, i++ )
        RefPicList0[ cIdx ] = pic( PicOrderCnt,
            RefPicSetInterView[ i ] )
    for( i=0; i < NumRpsStCurr1 &&
    cIdx <= num_ref_idx_l0_active_minus1; cIdx++, i++ )
        RefPicList0[ cIdx ] = pic( RefPicSetStCurr1[ i ], VOIdx )
    for( i=0; i < NumRpsLtCurr &&
    cIdx <= num_ref_idx_l0_active_minus1; cIdx++, i++ )
        RefPicList0[ cIdx ] = pic( RefPicSetLtCurr[ i ], VOIdx )
}
```

In the pseudo-code above, cIdx is a counter variable, NumRpsStCurr0 is the number of reference pictures in RefPicSetStCurr1, NumRpsStCurr1 is the number of reference pictures in RefPicSetStCurr1, NumRpsLtCurr is the number of reference pictures in RefPicSetLtCurr, RefPicList0 is list 0, and RefPicList1 is list 1. In addition, RefPicSetInterView is the set of inter-view reference pictures. The pic( ) function returns a reference picture, given a POC value and a view order index. VOIdx is a view order index of the current view component. PicOrderCnt is a POC value of the current view component. Alternatively, the pic ( ) function returns a reference picture, given a POC value of the reference picture and a view identifier (viewId) of the reference picture. Furthermore, num_ref_idx_l0_active_minus1 indicates the number of active reference pictures in list 0, minus 1. num_ref_idx_l1_active_minus1 indicates the number of active reference pictures in list 1, minus 1.

When prediction processing unit 152 performs the pseudo-code above, prediction processing unit 152 inserts, into reference picture list 0, each reference picture of RefPicSetStCurr0 with the view order index of the current view component, followed by each reference picture of RefPicSetInterView with a POC value equal to a POC value of the current view component, followed by each reference picture of RefPicSetStCurr1 with the view order index of the current view component, followed by each reference picture of RefPicSetLtCurr with the view order index of the current view component.

The following pseudo-code describes an example initialization process for list 1.

```
cIdx = 0
while( cIdx <= num_ref_idx_l1_active_minus1 )
{
    for( i=0; i < NumRpsStCurr1 &&
    cIdx <= num_ref_idx_l1_active_minus1; cIdx++, i++ )
        RefPicList1[ cIdx ] = pic( RefPicSetStCurr1[ i ], VOIdx )
    for( i=0; i < NumRpsInterView &&
    cIdx <= num_ref_idx_l1_active_minus1; cIdx++, i++ )
        RefPicList1[ cIdx ] = pic( PicOrderCnt,
            RefPicSetInterView[ i ] )
    for( i=0; i < NumRpsStCurr0 &&
    cIdx <= num_ref_idx_l1_active_minus1; cIdx++, i++ )
        RefPicList1[ cIdx ] = pic( RefPicSetStCurr0[ i ], VOIdx )
    for( i=0; i < NumRpsLtCurr &&
    cIdx <= num_ref_idx_l1_active_minus1; cIdx++, i++ )
        RefPicList1[ cIdx ] = pic( RefPicSetLtCurr[ i ], VOIdx )
}
```

When prediction processing unit 152 performs the pseudo-code above, prediction processing unit 152 inserts, into reference picture list 1, each reference picture of RefPicSetSt- Curr1 with the view order index of the current view component, followed by each reference picture of RefPicSetInterView with a POC value equal to a POC value of the current view component, followed by each reference picture of RefPicSetStCurr0 with the view order index of the current view component, followed by each reference picture of RefPicSetLtCurr with the view order index of the current view component.

In another example reference picture list initialization process, prediction processing unit 152 may insert inter-view reference pictures into list 0 immediately after the reference pictures of RefPicSetStCurr1. In this example, prediction processing unit 152 may insert inter-view reference pictures into list 1 immediately after the reference pictures of RefPicSetStCurr0. In this example initialization process, both list 0 and list 1 include at least one reference picture from RefPicSetStCurr0, RefPicSetStCurr1, RefPicSetLtCurr, or RefPicSetInterView. The following pseudo-code describes this example initialization process for list 0.

```
cIdx = 0
while( cIdx <= num_ref_idx_l0_active_minus1 )
{
    for( i=0; i < NumRpsStCurr0 &&
    cIdx <= num_ref_idx_l0_active_minus1; cIdx++, i++ )
        RefPicList0[ cIdx ] = pic( RefPicSetStCurr0[ i ], VOIdx )
    for( i=0; i < NumRpsStCurr1 &&
    cIdx <= num_ref_idx_l0_active_minus1; cIdx++, i++ )
        RefPicList0[ cIdx ] = pic( RefPicSetStCurr1[ i ], VOIdx )
    for( i=0; i < NumRpsInterView &&
    cIdx <= num_ref_idx_l0_active_minus1; cIdx++, i++ )
        RefPicList0[ cIdx ] = pic( PicOrderCnt,
            RefPicSetInterView[ i ] )
    for( i=0; i < NumRpsLtCurr &&
    cIdx <= num_ref_idx_l0_active_minus1; cIdx++, i++ )
        RefPicList0[ cIdx ] = pic( RefPicSetLtCurr[ i ], VOIdx )
}
```

When prediction processing unit 152 performs the pseudo-code above, prediction processing unit 152 inserts, into reference picture list 0, each reference picture of RefPicSetStCurr0 with the view order index of the current view component, followed by each reference picture of RefPicSetStCurr1 with the view order index of the current view component, followed by each reference picture of RefPicSetInterView with a POC value equal to a POC value of the current view component, followed by each reference picture of RefPicSetLtCurr with the view order index of the current view component.

The following pseudo-code describes an example initialization process for list 1.

```
cIdx = 0
while( cIdx <= num_ref_idx_l1_active_minus1 )
{
    for( i=0; i < NumRpsStCurr1 &&
    cIdx <= num_ref_idx_l1_active_minus1; cIdx++, i++ )
        RefPicList1[ cIdx ] = pic( RefPicSetStCurr1[ i ], VOIdx )
    for( i=0; i < NumRpsStCurr0 &&
    cIdx <= num_ref_idx_I1_active_minus1; cIdx++, i++ )
        RefPicList1[ cIdx ] = pic( RefPicSetStCurr0[ i ], VOIdx )
    for( i=0; i < NumRpsInterView &&
    cIdx <= num_ref_idx_l1_active_minus1; cIdx++, i++ )
        RefPicList1[ cIdx ] = pic( PicOrderCnt,
            RefPicSetInterView[ i ] )
    for( i=0; i < NumRpsLtCurr &&
    cIdx <= num_ref_idx_l1_active_minus1; cIdx++, i++ )
        RefPicList1[ cIdx ] = pic( RefPicSetLtCurr[ i ], VOIdx )
}
```

The terms in the pseudo-code above may have the same meanings as the terms in the pseudo-code of the previous example. When prediction processing unit 152 performs the pseudo-code above, prediction processing unit 152 inserts, into reference picture list 1, each reference picture of RefPicSetStCurr0 with the view order index of the current view component, followed by each reference picture of RefPicSetStCurr1 with the view order index of the current view component, followed by each reference picture of RefPicSetInterView with a POC value equal to a POC value of the current view component, followed by each reference picture of RefPicSetLtCurr with the view order index of the current view component.

In another example reference picture list initialization process, prediction processing unit 152 may insert inter-view reference pictures into list 0 and list 1 immediately after reference pictures of RefPicSetLtCurr. In this example initialization process, both list 0 and list 1 include at least one reference picture from RefPicSetStCurr0, RefPicSetStCurr1, RefPicSetLtCurr, or RefPicSetInterView. The following pseudo-code describes this example initialization process for list 0.

```
cIdx = 0
while( cIdx <= num_ref_idx_l0_active_minus1 )
{
    for( i=0; i < NumRpsStCurr0 &&
    cIdx <= num_ref_idx_l0_active_minus1; cIdx++, i++ )
        RefPicList0[ cIdx ] = pic( RefPicSetStCurr0[ i ], VOIdx )
    for( i=0; i < NumRpsStCurr1 &&
    cIdx <= num_ref_idx_l0_active_minus1; cIdx++, i++ )
        RefPicList0[ cIdx ] = pic( RefPicSetStCurr1[ i ], VOIdx )
    for( i=0; i < NumRpsLtCurr &&
    cIdx <= num_ref_idx_l0_active_minus1; cIdx++, i++ )
        RefPicList0[ cIdx ] = pic( RefPicSetLtCurr[ i ], VOIdx )
    for( i=0; i < NumRpsInterView &&
    cIdx <= num_ref_idx_l0_active_minus1; cIdx++, i++ )
        RefPicList0[ cIdx ] = pic( PicOrderCnt,
            RefPicSetInterView[ i ] )
}
```

When prediction processing unit 152 performs the pseudo-code above, prediction processing unit 152 inserts, into reference picture list 0, each reference picture of RefPicSetStCurr0 with the view order index of the current view component, followed by each reference picture of RefPicSetStCurr1 with the view order index of the current view component, followed by each reference picture of RefPicSetLtCurr with the view order index of the current view component, followed by each reference picture of RefPicSetInterView with a POC value equal to a POC value of the current view component.

The following pseudo-code describes this example initialization process for list 1.

```
cIdx = 0
while( cIdx <= num_ref_idx_l1_active_minus1 )
{
    for( i=0; i < NumRpsStCurr1 &&
    cIdx <= num_ref_idx_l1_active_minus1; cIdx++, i++ )
        RefPicList1[ cIdx ] = pic( RefPicSetStCurr1[ i ], VOIdx )
    for( i=0; i < NumRpsStCurr0 &&
    cIdx <= num_ref_idx_l1_active_minus1; cIdx++, i++ )
        RefPicList1[ cIdx ] = pic( RefPicSetStCurr0[ i ], VOIdx )
    for( i=0; i < NumRpsLtCurr &&
    cIdx <= num_ref_idx_l1_active_minus1; cIdx++, i++ )
        RefPicList1[ cIdx ] = pic( RefPicSetLtCurr[ i ], VOIdx )
```

```
        for( i=0; i < NumRpsInterView &&
        cIdx <= num_ref_idx_l1_active_minus1; cIdx++, i++ )
            RefPicList1[ cIdx ] = pic( PicOrderCnt,
            RefPicSetInterView[ i ] )
}
```

The terms in the pseudo-code above may have the same meanings as the terms in the pseudo-code of the previous example. When prediction processing unit 152 performs the pseudo-code above, prediction processing unit 152 inserts, into reference picture list 1, each reference picture of RefPicSetStCurr1 with the view order index of the current view component, followed by each reference picture of RefPicSetStCurr0 with the view order index of the current view component, followed by each reference picture of RefPicSetLtCurr with the view order index of the current view component, followed by each reference picture of RefPicSetInterView with a POC value equal to a POC value of the current view component.

In another example reference picture list initialization process, prediction processing unit 152 may insert inter-view reference pictures into list 0 immediately after the reference pictures of RefPicSetStCurr0, RefPicSetStCurr1, or RefPicSetLtCurr as described in the previous examples. Likewise, in this example, prediction processing unit 152 may insert inter-view reference pictures into list 1 immediately after the reference pictures of RefPicSetStCurr1, RefPicSetStCurr0, or RefPicSetLtCurr as described in the previous examples. However, in this example, prediction processing unit 152 may insert into list 0 inter-view reference pictures with view identifiers smaller than the view identifier of the current view component. Furthermore, in this example, prediction processing unit 152 may insert into list 1 inter-view reference pictures with view identifiers larger than the view identifier of the current view component. In this example initialization process, both list 0 and list 1 include at least one reference picture from RefPicSetStCurr0, RefPicSetStCurr1, RefPicSetLtCurr, or RefPicSetInterView. The following pseudo-code describes this example initialization process for list 0.

```
cIdx = 0
while( cIdx <= num_ref_idx_l0_active_minus1 )
{
    for( i=0; i < NumRpsStCurr0 &&
    cIdx <= num_ref_idx_l0_active_minus1; cIdx++, i++ )
        RefPicList0[ cIdx ] = pic( RefPicSetStCurr0[ i ], VOIdx )
    for( i=0; i < NumRpsInterViewFwd &&
    cIdx <= num_ref_idx_l0_active_minus1; cIdx++, i++ )
        RefPicList0[ cIdx ] = pic( PicOrderCnt,
        RefPicSetInterViewFwd[ i ] )
    for( i=0; i < NumRpsStCurr1 &&
    cIdx <= num_ref_idx_l0_active_minus1; cIdx++, i++ )
        RefPicList0[ cIdx ] = pic( RefPicSetStCurr1[ i ], VOIdx )
    for( i=0; i < NumRpsLtCurr &&
    cIdx <= num_ref_idx_l0_active_minus1; cIdx++, i++ )
        RefPicList0[ cIdx ] = pic( RefPicSetLtCurr[ i ], VOIdx )
}
```

When prediction processing unit 152 performs the pseudo-code above, prediction processing unit 152 inserts, into reference picture list 0, each reference picture of RefPicSetStCurr0 with the view order index of the current view component, followed by each reference picture of RefPicSetInterViewFwd with a POC value equal to a POC value of the current view component, followed by each reference picture of RefPicSetStCurr1 with the view order index of the current view component, followed by each reference picture of RefPicSetLtCurr with the view order index of the current view component.

The following pseudo-code describes this example initialization process for list 1.

```
cIdx = 0
while( cIdx <= num_ref_idx_l1_active_minus1 )
{
    for( i=0; i < NumRpsStCurr1 &&
    cIdx <= num_ref_idx_l1_active_minus1; cIdx++, i++ )
        RefPicList1[ cIdx ] = pic( RefPicSetStCurr1[ i ], VOIdx )
    for( i=0; i < NumRpsInterViewBwd &&
    cIdx <= num_ref_idx_l1_active_minus1; cIdx++, i++ )
        RefPicList1[ cIdx ] = pic( PicOrderCnt,
        RefPicSetInterViewBwd[ i ] )
    for( i=0; i < NumRpsStCurr0 &&
    cIdx <= num_ref_idx_l1_active_minus1; cIdx++, i++ )
        RefPicList1[ cIdx ] = pic( RefPicSetStCurr0[ i ], VOIdx )
    for( i=0; i < NumRpsLtCurr &&
    cIdx <= num_ref_idx_l1_active_minus1; cIdx++, i++ )
        RefPicList1[ cIdx ] = pic( RefPicSetLtCurr[ i ], VOIdx )
}
```

In the pseudo-code above, RefPicSetInterViewFwd is the subset of inter-view reference pictures with view identifiers smaller than the view identifier of the current view component. RefPicSetInterViewBwd is the subset of inter-view reference pictures with view identifiers larger than the view identifier of the current view component. The other terms in the pseudo-code above may have the same meanings as the terms in the pseudo-code of the previous examples.

When prediction processing unit 152 performs the pseudo-code above, prediction processing unit 152 inserts, into reference picture list 1, each reference picture of RefPicSetStCurr1 with the view order index of the current view component, followed by each reference picture of RefPicSetInterViewBwd with a POC value equal to a POC value of the current view component, followed by each reference picture of RefPicSetStCurr0 with the view order index of the current view component, followed by each reference picture of RefPicSetLtCurr with the view order index of the current view component.

In another example reference picture list initialization process, prediction processing unit 152 may insert inter-view reference pictures into list 0 immediately after the reference pictures of RefPicSetStCurr0, RefPicSetStCurr1, or RefPicSetLtCurr as described in the previous examples. Likewise, in this example, prediction processing unit 152 may insert inter-view reference pictures into list 1 immediately after the reference pictures of RefPicSetStCurr1, RefPicSetStCurr0, or RefPicSetLtCurr as described in the previous examples. However, when prediction processing unit 152 includes inter-view reference view components in reference picture list 0, prediction processing unit 152 may include each inter-view reference view component from RefPicSetInterViewFwd before any inter-view reference view components from RefPicSetInterViewBwd. When prediction processing unit 152 includes inter-view reference view components in reference picture list 1, prediction processing unit 152 may include each inter-view reference view component from RefPicSetInterViewBwd before inter-view reference view components from RefPicSetInterViewFwd. As in the previous example, RefPicSetInterViewFwd is the subset of inter-view reference pictures with view identifiers smaller than the view identifier of the current view component and RefPicSetInterViewBwd is the subset of inter-view reference pictures with view identifiers larger than the view identifier of the current view component. In this example initialization process, both list 0 and list 1 include at least one reference picture from RefPicSetStCurr0, RefPicSetStCurr1, RefPicSetLtCurr, or RefPicSetInterView. The following pseudo-code describes this example initialization process for list 0.

```
cIdx = 0
while( cIdx <= num_ref_idx_l0_active_minus1 )
{
    for( i=0; i < NumRpsStCurr0 &&
    cIdx <= num_ref_idx_l0_active_minus1; cIdx++, i++ )
        RefPicList0[ cIdx ] = pic( RefPicSetStCurr0[ i ], VOIdx )
    for( i=0; i < NumRpsInterViewFwd &&
    cIdx <= num_ref_idx_l0_active_minus1; cIdx++, i++ )
        RefPicList0[ cIdx ] = pic( PicOrderCnt,
            RefPicSetInterViewFwd[ i ] )
    for( i=0; i < NumRpsInterViewBwd &&
    cIdx <= num_ref_idx_l0_active_minus1; cIdx++, i++ )
        RefPicList0[ cIdx ] = pic( PicOrderCnt,
            RefPicSetInterViewBwd[ i ] )
    for( i=0; i < NumRpsStCurr1 &&
    cIdx <= num_ref_idx_l0_active_minus1; cIdx++, i++ )
        RefPicList0[ cIdx ] = pic( RefPicSetStCurr1[ i ], VOIdx )
    for( i=0; i < NumRpsLtCurr &&
    cIdx <= num_ref_idx_l0_active_minus1; cIdx++, i++ )
        RefPicList0[ cIdx ] = pic( RefPicSetLtCurr[ i ], VOIdx )
}
```

When prediction processing unit 152 performs the pseudo-code above, prediction processing unit 152 inserts, into reference picture list 0, each reference picture of RefPicSetStCurr0 with the view order index of the current view component, followed by each reference picture of RefPicSetInterViewFwd with a POC value equal to the POC value of the current view component, followed by each reference picture of RefPicSetStCurr1 with the view order index of the current view component, followed by each reference picture of RefPicSetLtCurr with the view order index of the current view component.

The following pseudo-code describes this example initialization process for list 1.

```
cIdx = 0
while( cIdx <= num_ref_idx_l1_active_minus1 )
{
    for( i=0; i < NumRpsStCurr1 &&
    cIdx <= num_ref_idx_l1_active_minus1; cIdx++, i++ )
        RefPicList1[ cIdx ] = pic( RefPicSetStCurr1[ i ], VOIdx )
    for( i=0; i < NumRpsInterViewBwd &&
    cIdx <= num_ref_idx_l1_active_minus1; cIdx++, i++ )
        RefPicList1[ cIdx ] = pic( PicOrderCnt,
            RefPicSetInterViewBwd[ i ] )
    for( i=0; i < NumRpsInterViewFwd &&
    cIdx <= num_ref_idx_l1_active_minus1; cIdx++, i++ )
        RefPicList1[ cIdx ] = pic( PicOrderCnt,
            RefPicSetInterViewFwd[ i ] )
    for( i=0; i < NumRpsStCurr0 &&
    cIdx <= num_ref_idx_l1_active_minus1; cIdx++, i++ )
        RefPicList1[ cIdx ] = pic( RefPicSetStCurr0[ i ], VOIdx )
    for( i=0; i < NumRpsLtCurr &&
    cIdx <= num_ref_idx_l1_active_minus1; cIdx++, i++ )
        RefPicList1[ cIdx ] = pic( RefPicSetLtCurr[ i ], VOIdx )
}
```

The terms in the pseudo-code above may have the same meanings as the terms in the pseudo-code of the previous example. When prediction processing unit 152 performs the pseudo-code above, prediction processing unit 152 inserts, into reference picture list 1, each reference picture of RefPicSetStCurr1 with the view order index of the current view component, followed by each reference picture of RefPicSetInterViewBwd with a POC value equal to the POC value of the current view component, followed by each reference picture of RefPicSetStCurr0 with the view order index of the current view component, followed by each reference picture of RefPicSetLtCurr with the view order index of the current view component.

In some example reference picture list initialization processes, prediction processing unit 152 may initialize lists 0 and 1 to include VSRPs. Prediction processing unit 152 may include the VSRPs at various positions within reference picture lists 0 and 1. For example, prediction processing unit 152 may initialize reference picture lists 0 and 1 such that the VSRPs are immediately after the inter-view reference view components. In another example, prediction processing unit 152 may initialize reference picture lists 0 and 1 such that the VSPRs are immediately before the inter-view reference view components.

After prediction processing unit 152 performs the initialization process on list 0 and list 1, prediction processing unit 152 may perform a reference picture list modification process to modify the order of reference pictures in list 0 and/or list 1. Prediction processing unit 152 may modify the order of reference pictures in list 0 and list 1 in response to RPLM commands signaled in the bitstream. As discussed above, the RPLM commands may include "list_modification_idc" syntax elements. The RPLM commands may have various syntaxes.

In a first example syntax for RPLM commands, if prediction processing unit 152 is modifying list 0 and the "list_modification_idc" syntax element is equal to 0, the "ref_pic_set_idx" syntax element is present and the "ref_pic_set_idx" syntax element corresponds to an index to a position in RefPicSetStCurr0. If prediction processing unit 152 is modifying list 1 and the "list_modification_idc" syntax element is equal to 0, the "ref_pic_set_idx" syntax element is present and the "ref_pic_set_idx" syntax element corresponds to an index to a position in RefPicSetStCurr1. Furthermore, if prediction processing unit 152 is modifying list 0 and the "list_modification_idc" syntax element is equal to 1, the "ref_pic_set_idx" syntax element is present and the "ref_pic_set_idx" syntax element corresponds to an index to a position in RefPicSetStCurr1. If prediction processing unit 152 is modifying list 1 and the "list_modification_idc" syntax element is equal to 1, the "ref_pic_set_idx" syntax element is present and the "ref_pic_set_idx" syntax element corresponds to an index to a position in RefPicSetStCurr0. If the "list_modification_idc" syntax element is equal to 2, the "ref_pic_set_idx" syntax element is present and the "ref_pic_set_idx" syntax element indicates an index to a position in RefPicSetLtCurr. If the "list_modification_idc" syntax element is equal to 3, prediction processing unit 152 stops the loop of modifying the reference picture list.

In this first example syntax, the "list_modification_idc" syntax element may also be equal to 4 or 5. If the "list_modification_idc" syntax element is equal to 4, the "ref_pic_set_idx" syntax element is present and corresponds to an index to RefPicSetInterView. If the "list_modification_idc" syntax element is equal to 5, the "ref_pic_set_idx" syntax element is present and corresponds to an index to RefPicSetVsrp. RefPicSetVsrp may be a set of VSRPs that may be used by the current view component for prediction reference. In this example, the "ref_pic_set_idx" syntax element may specify an index to RefPicSetStCurr0, RefPicSetCurr1, RefPicSetLtCurr, RefPicSetInterView, or RefPicSetVsrp of the reference picture being moved to the current index (e.g., refIdxLX) in the reference picture list.

In a second example syntax for RPLM commands similar to the first example Syntax described in the previous paragraph, there may never be more than one VSRP present.

Because there is only one VSPR present, there is no need to indicate which VSRP to insert into a reference picture list. Hence, in this example, the "ref_pic_set_idx" syntax element is not signaled if the "list_modification_idc" syntax element is equal to 5. Furthermore, there may be no need to signal a "list_modification_idc" syntax element equal to 5 for the multi-view extension of HEVC.

In a third example syntax for RPLM commands, the set of inter-view reference pictures is divided into RefPicSetInterViewFwd and RefPicSetInterViewBwd. RefPicSetInterViewFwd is a set of inter-view reference pictures with view identifiers smaller than a view identifier of the current view component. RefPicSetInterViewBwd is a set of inter-view reference pictures with view identifiers larger than the view identifier of the current view component. In this example, the "list_modification_idc" syntax element may also be equal to 4, 5, or 6. If the "list_modification_idc" syntax element is equal to 4, the "ref_pic_set_idx" syntax element is present and corresponds to an index to a position in RefPicSetInterViewFwd. If the "list_modification_idc" syntax element is equal to 5, the "ref_pic_set_idx" syntax element is present and corresponds to an index to a position in RefPicSetInterViewBwd. If the "list_modification_idc" syntax element is equal to 6, the "ref_pic_set_idx" syntax element is present and corresponds to an index to a position in RefPicSetVsrp.

In a fourth example syntax for RPLM commands, the "ref_pic_set_idx" syntax element specifies a relative value of an index. That is, the "ref_pic_set_idx" syntax element indicates a difference between an index and a previously-signaled value of the "ref_pic_set_idx" syntax element. In this example, RPLM commands may conform to the syntax of Table 10, below.

TABLE 10

| | Descriptor |
|---|---|
| ref_pic_list_modification( ) { | |
|   if( slice_type != 2 ) { | |
|     ref_pic_list_modification_flag_l0 | u(1) |
|     if( ref_pic_list_modification_flag_l0 ) | |
|       do { | |
|         list_modification_idc | ue(v) |
|         if( list_modification_idc != 3 ) | |
|           ref_pic_set_idx_diff_minus1 | ue(v) |
|     }while( list_modification_idc != 3 ) | |
|   } | |
|   if( slice_type % 5 == 1 ) { | |
|     ref_pic_list_modification_flag_l1 | u(1) |
|     if( ref_pic_list_modificationflag_l1 ) | |
|       do { | |
|         list_modification_idc | ue(v) |
|         if( list_modification_idc != 3 ) | |
|           ref_pic_set_idx_diff_minus1 | ue(v) |
|     } while( list_modification_idc != 3 ) | |
|   } | |
| } | |

In the example syntax of Table 10, the "list_modification_idc" syntax element may have a value between 0 and 10. If the "list_modification_idc" syntax element is equal to 3, prediction processing unit 152 ends the loop of modifying a reference picture list. In the examples below, preRefPicSetIdx is a value of a previous "ref_pic_set_idx_diff_minus1" syntax element. preRefPicSetIdx may initially be equal to −1. MaxNum is the maximum number of reference pictures in the relevant reference picture subset (e.g., RefPicSetStCurr0, RefPicSetStCurr1, etc).

If prediction processing unit 152 is modifying list 0 and the "list_modification_idc" syntax element is equal to 0, the "ref_pic_set_idx_diff_minus1" syntax element is present and prediction processing unit 152 may determine an index of a position in RefPicSetStCurr0 by calculating preRefPicSetIdx−(ref_pic_set_idx_diff_minus1+1)) % MaxNum. If prediction processing unit 152 is modifying list 0 and the "list_modification_idc" syntax element is equal to 1, the "ref_pic_set_idx_diff_minus1" syntax element is present and prediction processing unit 152 may determine an index of a position in RefPicSetStCurr1 by calculating preRefPicSetIdx+(ref_pic_set_idx_diff_minus1+1)) % MaxNum.

If prediction processing unit 152 is modifying list 0 and the "list_modification_idc" syntax element is equal to 2, the "ref_pic_set_idx_diff_minus1" syntax element is present and prediction processing unit 152 may determine an index of a position in RefPicSetStCurr1 by calculating preRefPicSetIdx−(ref_pic_set_idx_diff_minus1+1)) % MaxNum. If prediction processing unit 152 is modifying list 1 and the "list_modification_idc" syntax element is equal to 4, the "ref_pic_set_idx_diff_minus1" syntax element is present and prediction processing unit 152 may determine an index of a position in RefPicSetStCurr0 by calculating preRefPicSetIdx+(ref_pic_set_idx_diff_minus1+1)) % MaxNum.

If prediction processing unit 152 is modifying list 0 or list 1 and the "list_modification_idc" syntax element is equal to 5, the "ref_pic_set_idx_diff_minus1" syntax element is present and prediction processing unit 152 may determine an index of a position in RefPicSetLtCurr by calculating preRefPicSetIdx−(ref_pic_set_idx_diff_minus1+1)) % MaxNum. If prediction processing unit 152 is modifying list 0 or list 1 and the "list_modification_idc" syntax element is equal to 6, the "ref_pic_set_idx_diff_minus1" syntax element is present and prediction processing unit 152 may determine an index of a position in RefPicSetLtCurr by calculating preRefPicSetIdx+(ref_pic_set_idx_diff_minus1+1)) % MaxNum.

If prediction processing unit 152 is modifying list 0 or list 1 and the "list_modification_idc" syntax element is equal to 7, the "ref_pic_set_idx_diff_minus1" syntax element is present and prediction processing unit 152 may determine an index of a position in RefPicSetInterView by calculating preRefPicSetIdx−(ref_pic_set_idx_diff_minus1+1)) % MaxNum. If prediction processing unit 152 is modifying list 0 or list 1 and the "list_modification_idc" syntax element is equal to 8, the "ref_pic_set_idx_diff_minus1" syntax element is present and prediction processing unit 152 may determine an index of a position in RefPicSetInterView by calculating preRefPicSetIdx+(ref_pic_set_idx_diff_minus1+1)) % MaxNum.

If prediction processing unit 152 is modifying list 0 or list 1 and the "list_modification_idc" syntax element is equal to 9, the "ref_pic_set_idx_diff_minus1" syntax element is present and prediction processing unit 152 may determine an index of a position in RefPicSetInterVsrp by calculating preRefPicSetIdx−(ref_pictset_idx_diff_minus1+1)) % MaxNum. If prediction processing unit 152 is modifying list 0 or list 1 and the "list_modification_idc" syntax element is equal to 10, the "ref_pic_set_idx_diff_minus1" syntax element is present and prediction processing unit 152 may determine an index of a position in RefPicSetInterVsrp by calculating preRefPicSetIdx+(ref_pic_set_idx_diff_minus1+1)) % MaxNum.

Prediction processing unit 152 may perform various reference picture list modification processes based on RPLM commands. In one example, prediction processing unit 152 may receive syntax elements that conform to the RPLM syntaxes of the first or second examples, above. In this example, when the "ref_pic_list_modification_flag_l0" syntax element is equal to 1, prediction processing unit 152 may process the "list_modification_idc" syntax elements in an order that the "list_modification_idc" syntax elements occur in the bitstream. For each "list_modification_idc" syntax element, prediction processing unit 152 may determine whether the "list_modification_idc" syntax element is equal to 0, 1, 2, 4, or 5. If the "list_modification_idc" syntax element is equal to 0, 1, 2, 4, or 5, prediction processing unit 152 may perform a process to move one reference picture to a position in list 0 indicated by reference picture index. Prediction processing unit 152 may provide an index refIdxL0 as input to the process and may set refIdxL0 to the output of the process. RefIdxL0 is an index into list 0. Prediction processing unit 152 may initially set refIdxL0 to be equal to 0. The process to move a reference picture to a position in list 0 indicated by the reference picture index is described below. Otherwise, if the "list_modification_idc" syntax element is equal to 3, prediction processing unit 152 stops the reference picture list modification process for list 0.

In this example, when a current slice is a B slice and the "ref_pic_list_modification_flag_l1" syntax element is equal to 1, prediction processing unit 152 may process the "list_modification_idc" syntax elements in an order that the "list_modification_idc" syntax elements occur in the bitstream. For each "list_modification_idc" syntax element, prediction processing unit 152 may determine whether the "list_modification_idc" syntax element is equal to 0, 1, 2, 4, or 5. If the "list_modification_idc" syntax element is equal to 0, 1, 2, 4, or 5, prediction processing unit 152 may perform a process to move one reference picture to a position in list 1 indicated by the reference picture index. Prediction processing unit 152 may provide an index refIdxL1 as input to the process and may set refIdxL1 to the output of the process. RefIdxL1 is an index into list 1. Prediction processing unit 152 may initially set refIdxL1 to be equal to 0. The process to move one reference picture to a position in list 1 indicated by the reference picture index is described below. Otherwise, if the "list_modification_idc" syntax element is equal to 3, prediction processing unit 152 stops the reference picture list modification process for list 1.

As mentioned above, prediction processing unit 152 may perform a process to move a reference picture to a position in list 0 or 1 indicated reference picture index. This process may take the reference picture index as input and output an incremented reference picture index. The reference picture index may be denoted as refIdxLX, where X is equal to 0 for movement of a reference picture in list 0 and X is equal to 1 for movement of a reference picture in list 1. If the "list_modification_idc" syntax element is equal to 0 and the current reference picture list is list 0, the video decoder may designate RefPicSetStCurr0 as the current reference picture set. Otherwise, the "list_modification_idc" syntax element is equal to 0 and the current reference picture list is list 1, prediction processing unit 152 may designate RefPicStCurr1 as the current reference picture set. If the "list_modification_idc" syntax element is equal to 1 and the current reference picture list is list 0, prediction processing unit 152 may designate RefPicStCurr1 as the current reference picture set. If the "list_modification_idc" syntax element is equal to 1 and the current reference picture list is list 1, prediction processing unit 152 may designate RefPicStCurr0 as the current reference picture set. If the "list_modification_idc" syntax element is equal to 2, prediction processing unit 152 may designate RefPicSetLtCurr as the current reference picture set. In accordance with the techniques of this disclosure, if the "list_modification_idc" syntax element is equal to 4, prediction processing unit 152 may designate RefPicSetInterView as the current reference picture set. Furthermore, in accordance with the techniques of this disclosure, if the "list_modification_idc" syntax element is equal to 5, prediction processing unit 152 may designate RefPicSetVsrp as the current reference picture set. Alternatively, particular values (e.g., 4 and 5) of the "list_modification_idc" syntax element may designate RefPicSetInterViewFwd or RefPicSetInterviewBwd as the current reference picture set.

Furthermore, in the process to move a reference picture to a position in list 0 or 1 indicated by the reference picture index, prediction processing unit 152 may determine a relevant POC value, pocLX. In some examples, prediction processing unit 152 may determine pocLX as PicOrderCnt(curRefPicSet[ref_pic_set_idx]), where PicOrderCnt( ) returns the POC value of a view component and curRefPicSet is the current reference picture set. The relevant POC value may be the POC value of the reference picture in the current reference picture list at the position indicated by the "ref_pic_set_idx" syntax element. In addition, prediction processing unit 152 may determine a relevant view order index, vOIdx. In some examples, prediction processing unit 152 may determine vOIdx as viewOrderIdx(curRefPicSet[ref_pic_set_idx]), where viewOrderIdx( ) is a function that returns a view order index of a view component.

A VSRP may have the same POC values as the current view component and may have the same view order index as a view component from which the VSRP is originally synthesized. In some examples where prediction processing unit 152 synthesizes the VSRP from multiple view components, the view order index of the VSRP picture may be equal to the smallest view order index of the view components from which the VSRP is synthesized. In other examples where prediction processing unit 152 synthesizes the VSRP from multiple view components, the view order index of the VSRP picture may be equal to the view order index of any of the view components from which the VSRP is synthesized.

Prediction processing unit 152 may perform a process described by the following pseudo-code to insert a picture having a POC value equal to the relevant POC value into the current reference picture list at the position indicated by refIdxLX.

```
for( cIdx = num_ref_idx_lX_active_minus1 + 1; cIdx > refIdxLX; cIdx-- )
    RefPicListX[ cIdx ] = RefPicListX[ cIdx - 1]
RefPicListX[ refIdxLX++ ] = pocLX
nIdx = refIdxLX
for( cIdx = refIdxLX; cIdx <= num_ref_idx_lX_active_minus1 + 1; cIdx++ )
    if( PicOrderCnt( RefPicListX[ cIdx ] ) != pocLX ||
      viewOrderIdx( RefPicListX[ cIdx ] ) != vOIdx)
        RefPicListX[ nIdx++ ] = RefPicListX[ cIdx ]
```

When prediction processing unit 152 performs the process described by the pseudo-code above, prediction processing unit 152 may shift the reference pictures following the position indicated by refIdxLX to positions later in the reference picture list X, insert a reference picture having the relevant POC value (pocLX) into reference picture list X, increment refIdxLX, and remove a duplicate of the inserted reference picture from reference picture list X. In the pseudo-code above cIdx is a counter variable. Furthermore, in the pseudo-code above, num_ref_idx_lX_active_minus1 is a variable equal to the number of active reference pictures in the current reference picture list, minus 1. PicOrderCnt is a function that returns a POC value of a reference picture. In the pseudo-code above, the length of the current reference picture list may temporarily be one element longer than the length of the final version of the current reference picture list. Accordingly, after prediction processing unit 152 performs the operation described by the pseudo-code above, prediction processing unit 152 may retain only elements 0 through num_ref_idx_1X_active_minus1 in the final version of current reference picture list.

In the previous example motion reference picture list modification process, prediction processing unit 152 determines a relevant view order index, vOIdx, and uses the vOIdx to determine a position within a reference picture list at which to insert a reference picture. In another example, prediction processing unit 152 may perform a reference picture list modification process similar to that of the previous example, except that prediction processing unit 152 determines and uses a relevant view identifier, viewId, to identify an inter-view reference picture or VSRP instead of a view order index. For instance, prediction processing unit 152 may determine the relevant view identifier as ViewId(curRefPicSet[ref_pic_set_idx]), where ViewId is a function that returns a view identifier of a view component and curRefPicSet is the current reference picture set. In this example, prediction processing unit 152 may perform a procedure described by the following pseudo-code to insert a reference picture into a reference picture list.

```
for( cIdx = num_ref_idx_lX_active_minus1 + 1; cIdx >
refIdxLX; cIdx-- )
   RefPicListX[ cIdx ] = RefPicListX[ cIdx - 1]
RefPicListX[ refIdxLX++ ] = pocLX
nIdx = refIdxLX
for( cIdx = refIdxLX; cIdx <= num_ref_idx_lX_active_minus1 + 1;
cIdx++ )
   if( PicOrderCnt( RefPicListX[ cIdx ] ) != pocLX ||
   viewIdx( RefPicListX[ cIdx ] ) != viewId)
     RefPicListX[ nIdx++ ] = RefPicListX[ cIdx ]
```

In the discussion above, examples are described based on identifying pictures using POC and view order index. However, the same techniques may also apply based on identifying pictures using POC and view ID.

Continuing reference is now made to the example of FIG. 5. Reconstruction unit 158 may use the residual pixel blocks associated with TUs of a CU and the predictive pixel blocks of the PUs of the CU, i.e., either intra-prediction data or inter-prediction data, as applicable, to reconstruct the pixel block of the CU. In particular, reconstruction unit 158 may add samples of the residual pixel blocks to corresponding samples of the predictive pixel blocks to reconstruct the pixel block of the CU.

Filter unit 159 may perform a deblocking operation to reduce blocking artifacts associated with the pixel block of the CU. Video decoder 30 may store the pixel block of the CU in decoded picture buffer 160. Decoded picture buffer 160 may provide reference pictures for subsequent motion compensation, intra prediction, and presentation on a display device, such as display device 32 of FIG. 1. For instance, video decoder 30 may perform, based on the pixel blocks in decoded picture buffer 160, intra prediction or inter prediction operations on PUs of other CUs.

Figure 6:
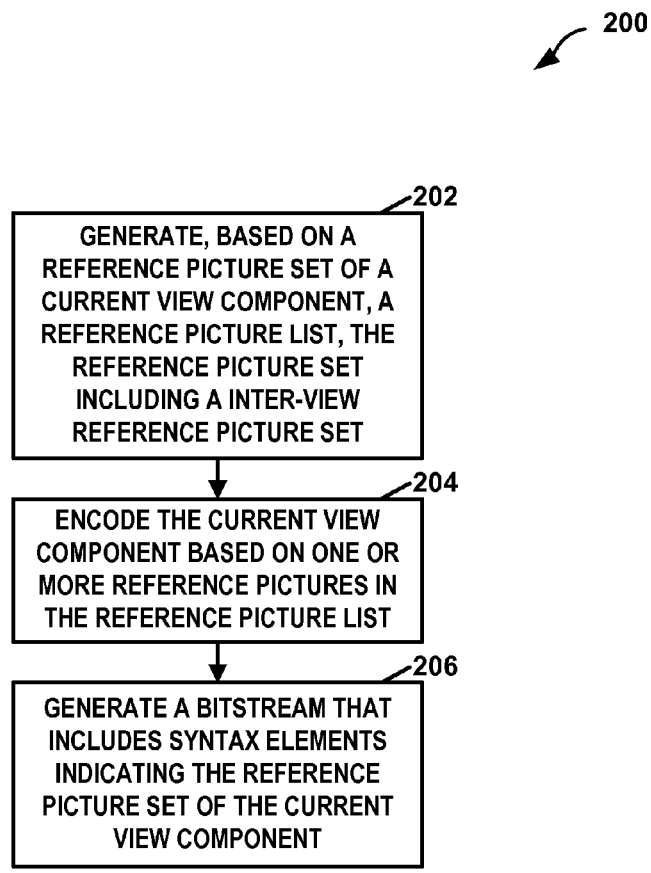
FIG. 6 is a flowchart that illustrates an example operation performed by the video encoder as part of a process to encode video data, in accordance with one or more techniques of this disclosure.

FIG. 6 is a flowchart that illustrates an example operation 200 performed by video encoder 20 as part of a process to encode video data, in accordance with one or more techniques of this disclosure. The flowchart of FIG. 6 and the flowcharts of the following figures are provided as examples. In other examples, the techniques of this disclosure may be implemented using more, fewer, or different steps than those shown in the example of FIG. 6 and the following figures.

In the example of FIG. 6, video encoder 20 generates, based on a reference picture set of a current view component of an access unit, a reference picture list for the current view component, the reference picture set including an inter-view reference picture set that includes a plurality of view components that belong to the access unit and that are associated with different views (202). Furthermore, video encoder 20 may encode the current view component based on one or more reference pictures in the reference picture list (204). Video encoder 20 may generate a bitstream that includes syntax elements indicating the reference picture set of the current view component (206).

Figure 7:
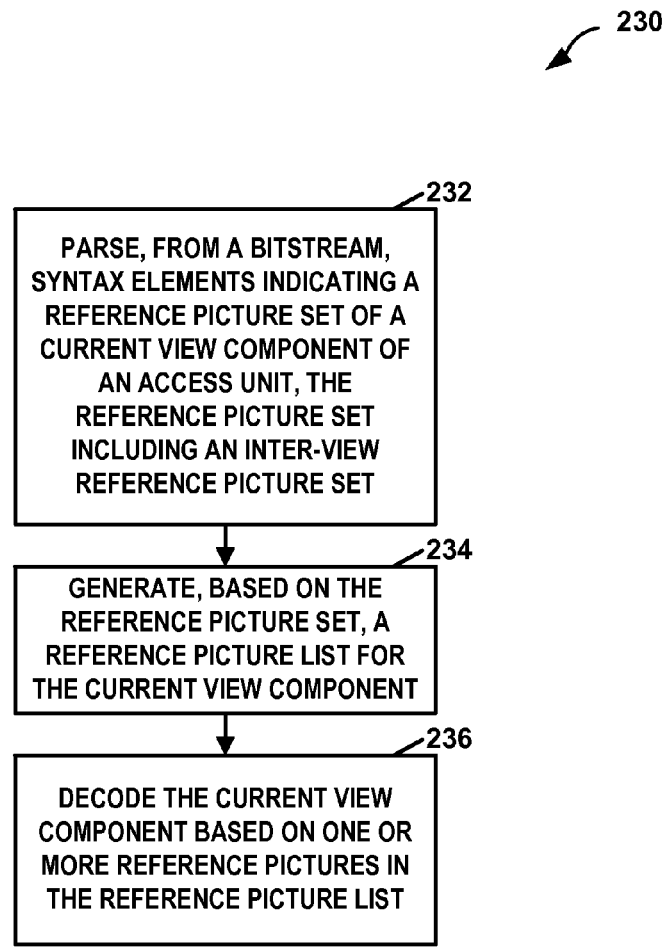
FIG. 7 is a flowchart that illustrates an example operation performed by the video decoder as part of a process to decode encoded video data, in accordance with one or more techniques of this disclosure.

FIG. 7 is a flowchart that illustrates an example operation 230 performed by video decoder 30 as part of a process to decode encoded video data, in accordance with one or more techniques of this disclosure. In the example of FIG. 7, video decoder 30 may parse, from a bitstream, syntax elements indicating a reference picture set of a current view component of an access unit, the reference picture set including an inter-view reference picture set that includes a plurality of view components that belong to the access unit and that are associated with different views (232). In addition, video decoder 30 may generate, based on the reference picture set, a reference picture list for the current view component (234). Video decoder 30 may decode the current view component based at least in part on one or more reference pictures in the reference picture list (236).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for multiview video decoding, the method comprising:
    generating a reference picture list for a current view component of a current view of video data to include, in the following order, each view component of a first subset of a reference picture set of the current view component, each view component of an inter-view reference picture set of the reference picture set of the current view component, each view component of a second subset of the current view component, and each view component of a third subset of the reference picture set of the current view component,
        the first subset consisting of short-term reference view components that are prior to the current view component in both decoding order and output order, the second subset consisting of short-term reference view components that are prior to the current view component in decoding order and that succeed the current view component in output order, the third subset consisting of long-term reference view components that are prior to the current view component in decoding order,
        the inter-view reference picture set consisting of view components that are not from the current view, the view components of the inter-view reference picture set being from a same access unit as the current view component, the view components of the inter-view reference picture set being usable by the current view component for inter-view prediction reference; and
    decoding at least a portion of the current view component based on one or more reference pictures in the reference picture list.

2. The method of clam 1, wherein the reference picture set further includes a fourth subset, a fifth subset, and a sixth subset, the fourth subset comprising short-term reference view components that are prior to the current view component in both decoding order and output order that are usable in inter prediction of one or more view components that follow the current view component and that are not used in inter prediction of the current view component, the fifth subset comprising short-term reference view components that are prior to the current view component in decoding order and succeed the current view component in output order that are usable in inter prediction of one or more view components following the current view component and that are not used in inter prediction of the current view component, the sixth subset comprising long-term reference view components that are prior to the current view component in decoding order that are usable in inter prediction of one or more view components following the current view component in decoding order and that are not used in inter prediction of the current view component.

3. The method of claim 1, further comprising performing a reference picture list modification process that changes a position in the reference picture list of an inter-view reference view component.

4. The method of claim 1, wherein the inter-view reference picture set is signaled in a sequence level and shared by all view components in the current view.

5. The method of claim 1, further comprising parsing, from a slice header, syntax elements indicating the reference picture set of the current view component of the access unit.

6. A method for video encoding, the method comprising:
    generating a reference picture list for a current view component of a current view of video data to include, in the following order, each view component of a first subset of a reference picture set of the current view component, each reference view component of an inter-view reference picture set of the current view component, each view component of a second subset of the reference picture set of the current view component, and each view component of a third subset of the reference picture set of the current view component,
        the first subset consisting of short-term reference view components that are prior to the current view component in both decoding order and output order, the second subset consisting of short-term reference view components that are prior to the current view component in decoding order and that succeed the current view component in output order, the third subset consisting of long-term reference view components that are prior to the current view component in decoding order,
        the inter-view reference picture set consisting of view components that are not from the current view, the view components of the inter-view reference picture set being from a same access unit as the current view component, the view components of the inter-view reference picture set being usable by the current view component for inter-view prediction reference; and
    encoding the current view component based at least in part on one or more reference pictures in the reference picture list.

7. The method of claim 6, wherein the reference picture set further comprises a fourth subset, a fifth subset, and a sixth subset, the fourth subset comprising short-term reference view components that are prior to the current view component in both decoding order and output order that are usable in inter prediction of one or more view components that follow the current view component and that are not used in inter prediction of the current view component, the fifth subset comprising short-term reference view components that are prior to the current view component in decoding order and succeed the current view component in output order that are usable in inter prediction of one or more view components following the current view component and that are not used in inter prediction of the current view component, the sixth subset comprising long-term reference view components that are prior to the current view component in decoding order that are usable in inter prediction of one or more view components following the current view component in decoding order and that are not used in inter prediction of the current view component.

8. The method of claim 6, further comprising performing a reference picture list modification process that changes a position in the reference picture list of an inter-view reference view component.

9. The method of claim 6, further comprising signaling the inter-view reference picture set in a sequence level, wherein the inter-view reference picture set is shared by all view components in the current view.

10. The method of claim 6, further comprising generating a slice header that includes syntax elements indicating the reference picture set.

11. A video decoding device that comprises:
a storage medium configured to store video data; and
one or more processors configured to:
  generate a reference picture list for a current view component of a current view of the video data to include, in the following order, each view component of a first subset of a reference picture set of the current view component, each view component of an inter-view reference picture set of the reference picture set of the current view component, followed by each view component of a second subset of the current view component, and followed by each view component of a third subset of the reference picture set of the current view component,
  the first subset consisting of short-term reference view components that are prior to the current view component in both decoding order and output order, the second subset consisting of short-term reference view components that are prior to the current view component in decoding order and that succeed the current view component in output order, the third subset consisting of long-term reference view components that are prior to the current view component in decoding order,
  the inter-view reference picture set consisting of view components that are not from the current view, the view components of the inter-view reference picture set being from a same access unit as the current view component, the view components of the inter-view reference picture set being usable by the current view component for inter-view prediction reference; and
  decode at least a portion of the current view component based on one or more reference pictures in the reference picture list.

12. The video decoding device of clam 11, wherein the reference picture set further includes a fourth subset, a fifth subset, and a sixth subset, the fourth subset comprising short-term reference view components that are prior to the current view component in both decoding order and output order that are usable in inter prediction of one or more view components that follow the current view component and that are not used in inter prediction of the current view component, the fifth subset comprising short-term reference view components that are prior to the current view component in decoding order and succeed the current view component in output order that are usable in inter prediction of one or more view components following the current view component and that are not used in inter prediction of the current view component, the sixth subset comprising long-term reference view components that are prior to the current view component in decoding order that are usable in inter prediction of one or more view components following the current view component in decoding order and that are not used in inter prediction of the current view component.

13. The video decoding device of claim 11, wherein the one or more processors are configured to perform a reference picture list modification process that changes a position in the reference picture list of an inter-view reference view component.

14. The video decoding device of claim 11, wherein the inter-view reference picture set is signaled in a sequence level and shared by all view components in the current view.

15. The video decoding device of claim 11, wherein the one or more processors are configured to parse, from a slice header, syntax elements indicating the reference picture set of the current view component of the access unit.

16. The video decoding device of claim 11, wherein the video decoding device comprises at least one of:
an integrated circuit;
a microprocessor; or
a wireless handset.

17. The video decoding device of claim 11, further comprising a display configured to display decoded video data.

18. A video encoding device that comprises:
a storage medium configured to store video data; and
one or more processors configured to:
  generate a reference picture list for a current view component of a current view of the video data to include, in the following order, each view component of a first subset of a reference picture set of the current view component, each reference view component of an inter-view reference picture set of the current view component, each view component of a second subset of the reference picture set of the current view component, and each view component of a third subset of the reference picture set of the current view component,
  the first subset consisting of short-term reference view components that are prior to the current view component in both decoding order and output order, the second subset consisting of short-term reference view components that are prior to the current view component in decoding order and that succeed the current view component in output order, the third subset consisting of long-term reference view components that are prior to the current view component in decoding order,
  the inter-view reference picture set consisting of view components that are not from the current view, the view components of the inter-view reference picture set being from a same access unit as the current view component, the view components of the inter-view reference picture set being usable by the current view component for inter-view prediction reference; and
  encode the current view component based on one or more reference pictures in the reference picture list.

19. The video encoding device of claim 18, wherein the reference picture set further includes a fourth subset, a fifth subset, and a sixth subset, the fourth subset comprising short-term reference view components that are prior to the current view component in both decoding order and output order that are usable in inter prediction of one or more view components that follow the current view component and that are not used in inter prediction of the current view component, the fifth subset comprising short-term reference view components that are prior to the current view component in decoding order and succeed the current view component in output order that are usable in inter prediction of one or more view components following the current view component and that are not used in inter prediction of the current view component, the sixth subset comprising long-term reference view components that are prior to the current view component in decoding order that are usable in inter prediction of one or more view components following the current view component in decoding order and that are not used in inter prediction of the current view component.

20. The video encoding device of claim 18, wherein the one or more processors are configured to perform a reference picture list modification process that changes a position in the reference picture list of an inter-view reference view component.

21. The video encoding device of claim 18, wherein the one or more processors are configured to signal the inter-view reference picture set in a sequence level, wherein the inter-view reference picture set is shared by all view components in the current view.

22. The video encoding device of claim 18, wherein the one or more processors are configured to generate a slice header that includes syntax elements indicating the reference picture set.

23. The video encoding device of claim 18, wherein the video encoding device comprises at least one of:
 an integrated circuit;
 a microprocessor; or
 a wireless handset.

24. The video encoding device of claim 18, further comprising a camera configured to capture the video data.

25. A video decoding device comprising:
 means for generating a reference picture list for a current view component of a current view of video data to include, in the following order, each view component of a first subset of a reference picture set of the current view component, each view component of an inter-view reference picture set of the reference picture set of the current view component, each view component of a second subset of the current view component, and each view component of a third subset of the reference picture set of the current view component,
  the first subset consisting of short-term reference view components that are prior to the current view component in both decoding order and output order, the second subset consisting of short-term reference view components that are prior to the current view component in decoding order and that succeed the current view component in output order, the third subset consisting of long-term reference view components that are prior to the current view component in decoding order,
  the inter-view reference picture set consisting of view components that are not from the current view, the view components of the inter-view reference picture set being from a same access unit as the current view component, the view components of the inter-view reference picture set being usable by the current view component for inter-view prediction reference; and means for decoding at least a portion of the current view component based on one or more reference pictures in the reference picture list.

26. A video encoding device comprising:
 means for generating a reference picture list for a current view component of a current view of video data to include, in the following order, each view component of a first subset of a reference picture set of the current view component, each reference view component of an inter-view reference picture set of the current view component, each view component of a second subset of the reference picture set of the current view component, and each view component of a third subset of the reference picture set of the current view component,
  the first subset consisting of short-term reference view components that are prior to the current view component in both decoding order and output order, the second subset consisting of short-term reference view components that are prior to the current view component in decoding order and that succeed the current view component in output order, the third subset consisting of long-term reference view components that are prior to the current view component in decoding order,
  the inter-view reference picture set consisting of view components that are not from the current view, the view components of the inter-view reference picture set being from a same access unit as the current view component, the view components of the inter-view reference picture set being usable by the current view component for inter-view prediction reference; and
 means for encoding the current view component based on one or more reference pictures in the reference picture list.

27. A non-transitory computer-readable storage medium that stores computer-executable instructions that, when executed by one or more processors of a video decoding device, configure the video decoding device to:
 generate a reference picture list for a current view component of a current view of video data to include, in the following order, each view component of a first subset of a reference picture set of the current view component, each view component of an inter-view reference picture set of the reference picture set of the current view component, each view component of a second subset of the current view component, and each view component of a third subset of the reference picture set of the current view component,
  the first subset consisting of short-term reference view components that are prior to the current view component in both decoding order and output order, the second subset consisting of short-term reference view components that are prior to the current view component in decoding order and that succeed the current view component in output order, the third subset consisting of long-term reference view components that are prior to the current view component in decoding order,
  the inter-view reference picture set consisting of view components that are not from the current view, the view components of the inter-view reference picture set being from a same access unit as the current view component, the view components of the inter-view reference picture set being usable by the current view component for inter-view prediction reference; and decode at least a portion of the current view component based on one or more reference pictures in the reference picture list.

28. A non-transitory computer-readable storage medium that stores computer-executable instructions that, when executed by one or more processors of a video encoding device, configure the video encoding device to:

generate a reference picture list for a current view component of a current view of video data to include, in the following order, each view component of a first subset of a reference picture set of the current view component, each reference view component of an inter-view reference picture set of the current view component, each view component of a second subset of the reference picture set of the current view component, and each view component of a third subset of the reference picture set of the current view component, the first subset consisting of short-term reference view components that are prior to the current view component in both decoding order and output order, the second subset consisting of short-term reference view components that are prior to the current view component in decoding order and that succeed the current view component in output order, the third subset consisting of long-term reference view components that are prior to the current view component in decoding order, the inter-view reference picture set consisting of view components that are not from the current view, the view components of the inter-view reference picture set being from a same access unit as the current view component, the view components of the inter-view reference picture set being usable by the current view component for inter-view prediction reference; and encode the current view component based on one or more reference pictures in the reference picture list.

* * * * *